US012020838B2

(12) United States Patent
Chen et al.

(10) Patent No.: US 12,020,838 B2
(45) Date of Patent: Jun. 25, 2024

(54) INDUCTIVE DEVICE AND MANUFACTURING METHOD THEREOF

(71) Applicant: CHILISIN ELECTRONICS CORP., Hsinchu County (TW)

(72) Inventors: Chia-Chen Chen, Taoyuan (TW); Yu-Cheng Chang, Taoyuan (TW); Hsin Hsien Yeh, Taoyuan (TW)

(73) Assignee: CHILISIN ELECTRONICS CORP., Hsinchu County (TW)

( * ) Notice: Subject to any disclaimer, the term of this patent is extended or adjusted under 35 U.S.C. 154(b) by 506 days.

(21) Appl. No.: 17/334,877

(22) Filed: May 31, 2021

(65) Prior Publication Data

US 2021/0383954 A1 Dec. 9, 2021

(30) Foreign Application Priority Data

Jun. 9, 2020 (TW) ................................ 109119302
Jun. 9, 2020 (TW) ................................ 109207198
Apr. 8, 2021 (TW) ................................ 110112740

(51) Int. Cl.
*H01F 17/04* (2006.01)
*H01F 3/08* (2006.01)
(Continued)

(52) U.S. Cl.
CPC ............... *H01F 17/04* (2013.01); *H01F 3/08* (2013.01); *H01F 27/022* (2013.01);
(Continued)

(58) Field of Classification Search
CPC .......... H01F 17/04; H01F 3/08; H01F 27/022; H01F 27/2828; H01F 41/0246; H01F 2017/048
See application file for complete search history.

(56) References Cited

U.S. PATENT DOCUMENTS 8,339,229 B2 12/2012 Wu
8,695,209 B2 4/2014 Saito et al.
(Continued)

FOREIGN PATENT DOCUMENTS

CN 101859641 A 10/2010
CN 104036920 A 9/2014
(Continued)

*Primary Examiner* — Malcolm Barnes
(74) *Attorney, Agent, or Firm* — Li & Cai Intellectual Property (USA) Office

(57) ABSTRACT

An inductive device and a manufacturing method thereof are provided. The inductive device includes a magnetic base, a coil structure, and a package structure. The magnetic base has an assembling surface, and an arrangement region is defined thereon. The coil structure is assembled to the magnetic base and includes a coil body, a first extending section, and a second extending section. The coil body has a though hole corresponding in position to the arrangement region, and the first and second extending sections both extend from the coil body toward the magnetic base and are wound on the magnetic base. The package structure covers the magnetic base and the coil structure. The package structure includes a magnetic molding main body, and a portion of the magnetic molding main body fills into the through hole of the coil body and is connected to the magnetic base.

19 Claims, 22 Drawing Sheets

(51) Int. Cl.
*H01F 27/02* (2006.01)
*H01F 27/28* (2006.01)
*H01F 41/02* (2006.01)

(52) U.S. Cl.
CPC ..... *H01F 27/2828* (2013.01); *H01F 41/0246* (2013.01); *H01F 2017/048* (2013.01)

(56) References Cited

U.S. PATENT DOCUMENTS

| | | | | |
|---|---|---|---|---|
| 2010/0259353 | A1* | 10/2010 | Saito | H01F 41/127 336/205 |
| 2012/0169449 | A1* | 7/2012 | Wu | H05K 1/18 336/221 |
| 2013/0307655 | A1* | 11/2013 | Saito | H01F 27/292 336/83 |
| 2017/0084385 | A1* | 3/2017 | Ida | H01F 27/2852 |
| 2019/0392978 | A1* | 12/2019 | Matsuura | H01F 17/04 |

FOREIGN PATENT DOCUMENTS

| | | | |
|---|---|---|---|
| CN | 104051129 | A | 9/2014 |
| CN | 106057445 | A | 10/2016 |
| TW | 201042677 | A1 | 12/2010 |
| TW | 201230091 | A1 | 7/2012 |
| TW | 201440089 | A | 10/2014 |
| TW | 202018740 | A | 5/2020 |

* cited by examiner

INDUCTIVE DEVICE AND MANUFACTURING METHOD THEREOF

CROSS-REFERENCE TO RELATED PATENT APPLICATION

This application claims the benefit of priority to Taiwan Patent Application Nos. 109119302, filed on Jun. 9, 2020, 109207198, filed on Jun. 9, 2020, and 110112740, filed on Apr. 8, 2021. The entire content of the above identified applications are incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a passive device and a manufacturing method thereof, and more particularly to an inductive device and a manufacturing method thereof.

BACKGROUND OF THE DISCLOSURE

An inductor is a passive device that has been widely used in a circuit design. Inductors may have different structures depending on different requirements. In one conventional inductor, a coil is wound on a magnetic core. Specifically, the magnetic core includes a bottom base and a core column protruding from the bottom base. When the coil is fabricated and wound on the magnetic core, the core column can serve as a supporting structure so as to form a winding portion of the coil, and non-wound portions, i.e., other portions that are not wound on the core column, are fixed to the bottom base of the magnetic core.

However, based on a conventional winding method of the coil, a coil size (or a coil diameter) of the inductor would be limited to the size of the core column. When the coil size of the inductor needs to be adjusted to satisfy requirements of different products or circuit designs, it is necessary to fabricate different kinds of magnetic cores having core columns respectively of different sizes, which causes the fabrication cost to be significantly increased. If only other parameters aside from the coil size, such as a quantity of coil turns or a coil pitch, are adjusted to prevent the fabrication cost from being increased, the degree of the design freedom for the inductor will be limited, making it difficult to design and develop different inductors to satisfy different kinds of products.

Additionally, since the size of the inductor is reduced, the sizes of the magnetic core and the core column will also have to be reduced. However, the smaller the sizes of the magnetic core and the core column, the more difficult the shaping of the core column is. As such, how the structure of the inductor can be modified to allow for a more flexible design thereof, while preventing equipment and fabrication costs from being increased, is still one of the issues to be solved in the related art.

SUMMARY OF THE DISCLOSURE

In response to the above-referenced technical inadequacies, the present disclosure provides an inductive device and a manufacturing method thereof, so that the inductive device can be more flexibly designed, and the fabrication cost of the inductive device can be prevented from being increased.

In one aspect, the present disclosure provides an inductive device including a magnetic base, a coil structure, and a package structure. The magnetic base has an assembling surface, and an arrangement region is defined on the assembling surface. The coil structure is assembled to the magnetic base and includes a coil body, a first extending section, and a second extending section. The coil body has a though hole corresponding in position to the arrangement region, and the first and second extending sections both extend from the coil body toward the magnetic base and are wound on the magnetic base. The package structure covers the magnetic base and the coil structure. The package structure includes a magnetic molding main body, and a portion of the magnetic molding main body fills into the through hole of the coil body and is connected to the magnetic base.

In another aspect, the present disclosure provides a manufacturing method of an inductive device including the following steps: providing a magnetic base having an assembling surface, in which an arrangement region is defined on the assembling surface; assembling a coil structure to the magnetic base, in which the coil structure includes a coil body, a first extending section, and a second extending section, the coil body has a though hole arranged corresponding in position to the arrangement region, and the first and second extending sections both extend from the coil body toward the magnetic base and are wound on the magnetic base; and forming a package structure to cover the magnetic base and the coil structure, in which the package structure includes a magnetic molding main body, and a portion of the magnetic molding main body fills into the through hole of the coil body and is connected to the magnetic base.

Therefore, in the inductive device and manufacturing method thereof provided in the present disclosure, by virtue of "providing a magnetic base having an assembling surface, in which an arrangement region is defined on the assembling surface," "assembling a coil structure to the magnetic base, in which the coil structure includes a coil body, a first extending section, and a second extending section, the coil body has a though hole corresponding in position to the arrangement region" and "forming a package structure to cover the magnetic base and the coil structure, in which the package structure includes a magnetic molding main body, and a portion of the magnetic molding main body fills into the through hole of the coil body and is connected to the magnetic base," the inductive device can be more flexibly designed, and the fabrication and development costs can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
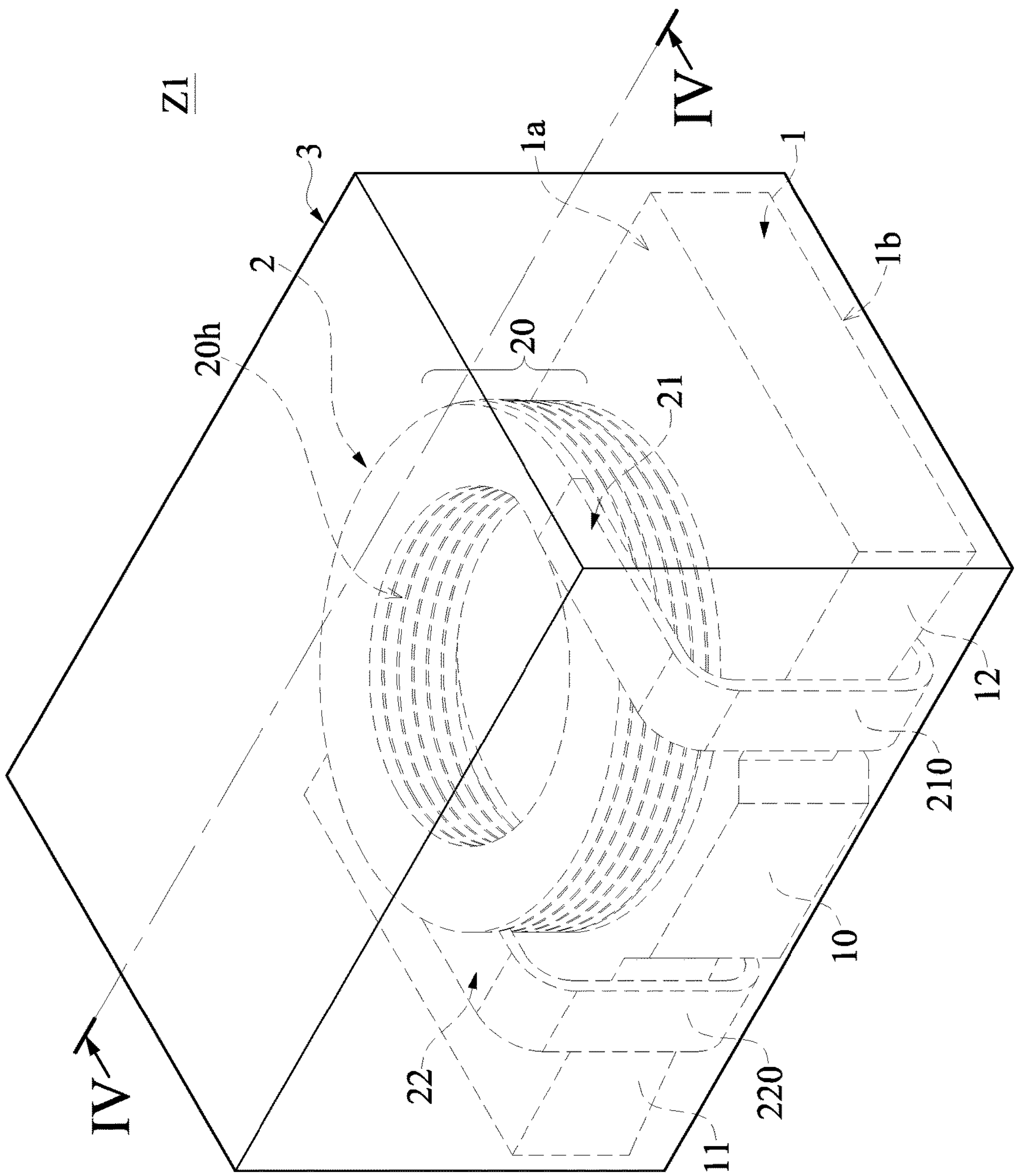
FIG. 1 is a schematic perspective view of an inductive device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2A:
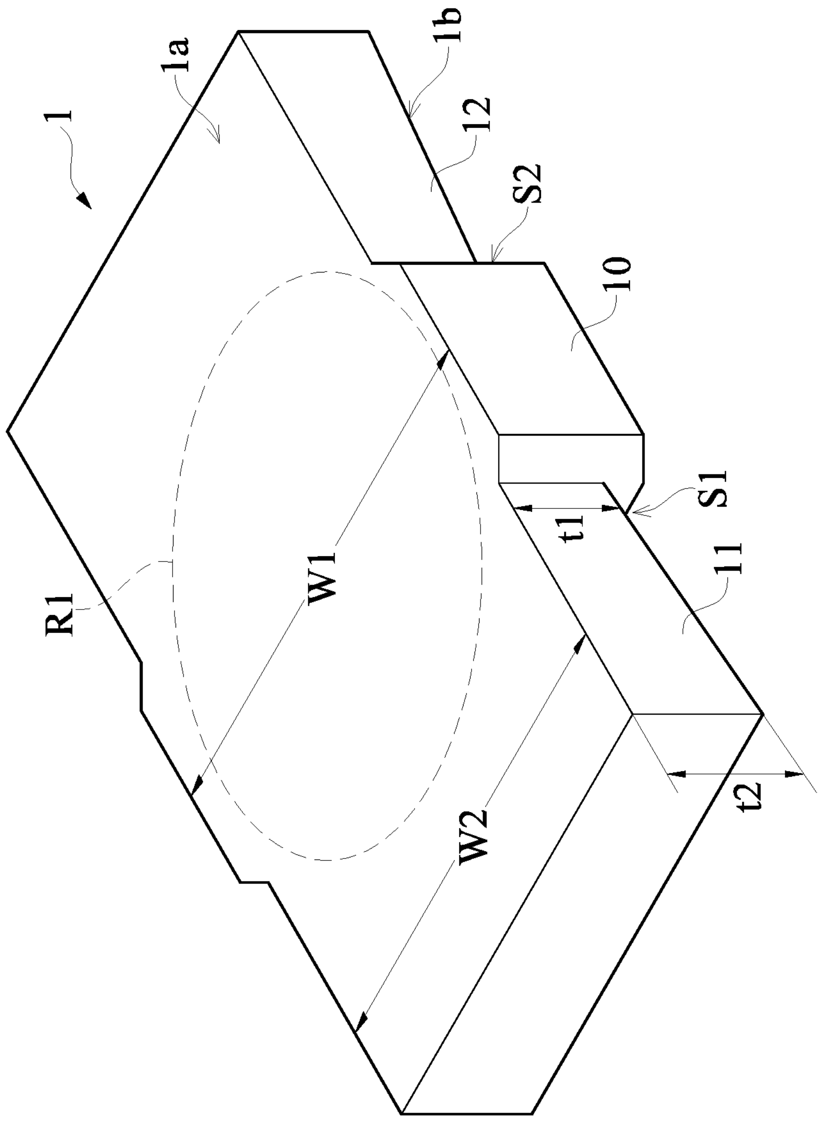
FIG. 2A is a schematic perspective view of a magnetic base according to an embodiment of the present disclosure.

Reference is made to FIG. 1 and FIG. 2A. FIG. 1 is a schematic perspective view of an inductive device according to a first embodiment of the present disclosure, and FIG. 2A is a schematic perspective view of a magnetic base according to an embodiment of the present disclosure. An inductive device Z1 includes a magnetic base 1, a coil structure 2, and a package structure 3.

As shown in FIG. 1 and FIG. 2A, the magnetic base 1 is made of a magnetic material, and has an assembling surface 1*a* and a bottom surface 1*b* opposite to the assembling surface 1*a*. The aforementioned magnetic material includes at least one of crystalline magnetic metal powder and amorphous magnetic metal powder. The crystalline magnetic metal powder can be, for example, but not limited to, Fe—Si powder, Fe—Si—Cr powder, Fe—Si—Al powder, Fe—Ni powder, carbonyl iron (CIP) powder, iron powder, Fe—Ni—Mo powder, Fe—Co—V powder, or any combination thereof. The amorphous magnetic metal powder can be Fe-based amorphous magnetic metal powder, such as, FeSiBC, FeSiCrBPC, or any combination thereof, but the present disclosure is not limited thereto. The magnetic base 1 is mainly made of the crystalline magnetic metal powder, such as, a material that is mixed with carbonyl iron powder.

The magnetic base 1 has an arrangement region R1 defined on the assembling surface 1*a* so that the coil structure 2 can be arranged in the arrangement region R1. It is worth mentioning that the magnetic base 1 of the embodiment in the present disclosure is a coreless magnetic base. That is to say, the assembling surface 1*a* of the magnetic base 1 does not have any core column protruding from the arrangement region R1.

Reference is made to FIG. 2A. In one embodiment, the magnetic base 1 has a flat surface at the arrangement region R1 for arranging the coil structure 2, but the present disclosure is not limited thereto. In another embodiment, the magnetic base 1 can have a positioning recess located at the arrangement region R1. When the coil structure 2 is assembled to the arrangement region R1, a jig can be used and corresponds in position to the positioning recess to define a position of the coil structure 2.

Reference is made to FIG. 2A. In the instant embodiment, the magnetic base 1 includes a middle portion 10 and two extending wing portions 11, 12 connected to the middle portion 10. To be more specific, two extending wing portions 11, 12 are located at two opposite sides of the middle portion 10, and extend from the middle portion 10 in two opposite directions, respectively. In the instant embodiment, each of the extending wing portions 11, 12 is substantially in a wedge shape. Specifically, a thickness of each of the extending wing portions 11, 12 gradually increases along a direction away from the middle portion 10. That is to say, a thickness t1 at a side (that is closer to the middle portion 10) of each of the extending wing portions 11, 12 is less than a thickness t2 at another side (that is farther away from the middle portion 10) of each of the extending wing portions 11, 12.

In the instant embodiment, two bottom surfaces of the extending wing portions 11, 12 are both recessed inwardly from the bottom surface of the middle portion 10, such that two stepped structures S1, S2 are formed at the bottom surface 1*b* of the magnetic base 1. As such, when the coil structure 2 is assembled to the magnetic base 1, the position of the coil structure 2 can be fixed.

Figure 3:
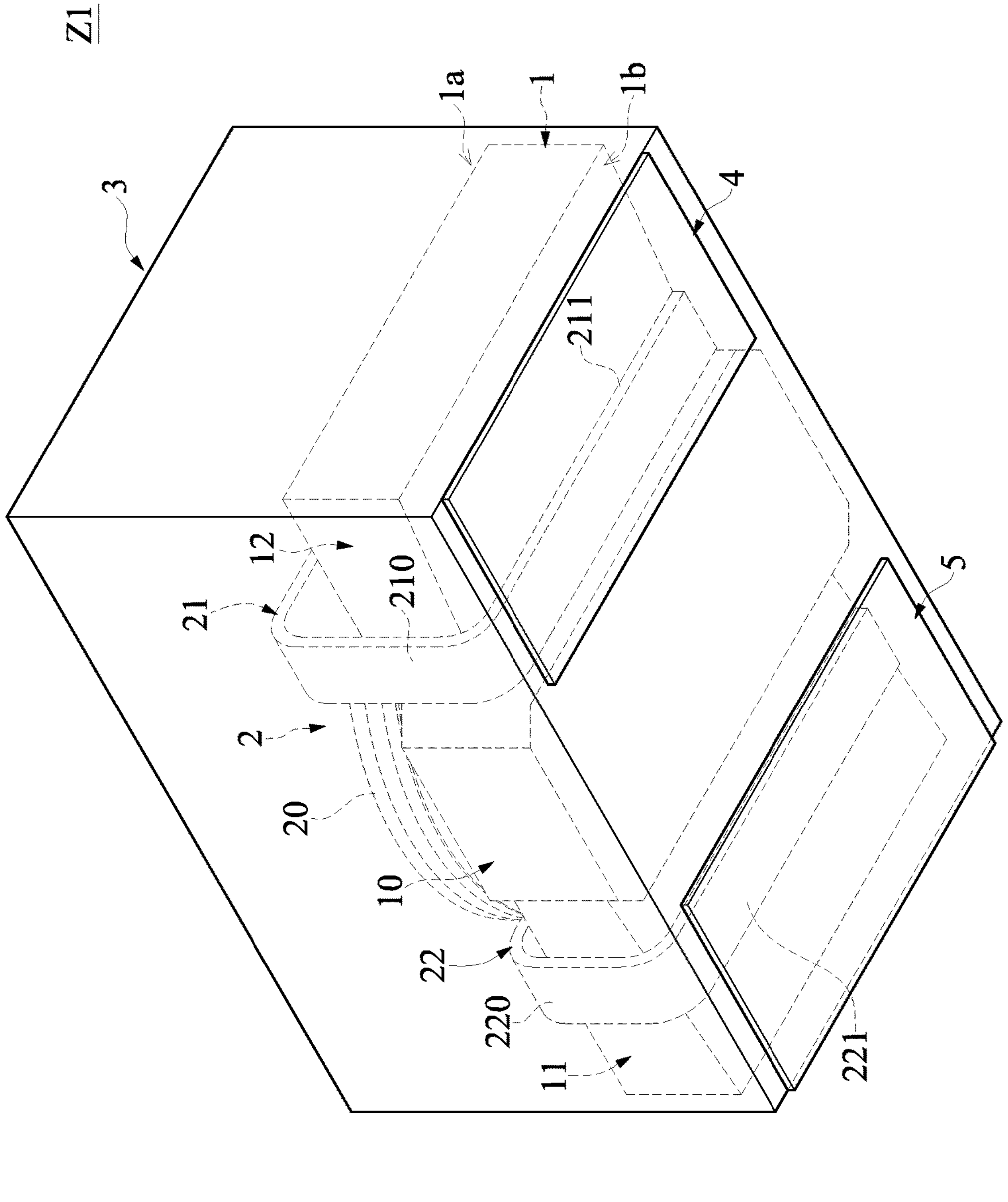
FIG. 3 is another schematic perspective view of the inductive device according to the first embodiment of the present disclosure.

Reference is made to FIG. 1 and FIG. 3. FIG. 3 is another schematic perspective view of the inductive device according to the first embodiment of the present disclosure. The coil structure 2 is assembled to the magnetic base 1, and the coil structure 2 can be fabricated by winding a conductive wire so as to form a coil body 20, a first extending section 21, and a second extending section 22. For example, the conductive wire can be wound in a flat manner or in an alpha manner to form the coil structure 2. The aforementioned conductive wire can be a flat wire or a round wire, and includes an inner conductive line and an insulation covering layer.

The coil body 20 of the instant embodiment includes a plurality of loops (not designated by any reference numerals), and the loops are arranged to surround the same imaginary central axis. Accordingly, the coil body 20 has a through hole 20*h*, and the coil body 20 is arranged on the assembling surface 1*b* with the though hole 20*h* corresponding in position to the arrangement region R1 of the magnetic base 1. Furthermore, in the instant embodiment, the loops are stacked on top of one another along a normal direction of the assembling surface 1*a*, but the present disclosure is not limited thereto. In another embodiment, the loops of the coil body 20 surrounding the same imaginary central axis can be sequentially disposed from inside to outside or from outside to inside on the assembling surface 1*a* of the magnetic base 1.

As shown in FIG. 1, the first extending section 21 and the second extending section 22 both extend from the coil body 20 toward the magnetic base 1 and are wound thereon. Specifically, the first extending section 21 and the second extending section 22 are two end sections of the conductive wire, respectively, that are not wound to form any one of the loops. Reference is made to FIG. 1 and FIG. 3. In the instant embodiment, the first extending section 21 extends from the topmost loop and is bent toward the magnetic base 1, and then extends to the bottom surface 1*b* of the magnetic base 1. Furthermore, the second extending section 22 extends from the bottom-most loop, across the assembling surface 1*a* and a side surface of the magnetic base 1, and then to the bottom surface 1*b* of the magnetic base 1, but the present disclosure is not limited thereto.

Reference is made to FIG. 1 and FIG. 3. The first extending section 21 and the second extending section 22 corresponding to the two stepped structures S1 S2 are wound on the two extending wing portions 11, 12, respectively, and arranged at a bottom side (the bottom surface 1*b*) of the magnetic base 1. It should be noted that since each of the extending wing portions 11, 12 has the thickness gradually increasing along the direction away from the middle portions 10, the structures of the extending wing portions 11, 12 are beneficial for the convenience in winding and fixing the first and second extending sections 21, 22 on the magnetic base 1 during a step of assembling the coil structure 2 to the magnetic base 1. As such, the first and second extending sections 21, 23 can be prevented from sliding outwards from the middle portion 10 and being loosed.

Reference is made to FIG. 3. To be more specific, the first extending section 21 and the second extending section 22 are both bent to respectively form a first bent portion 210 and a second bent portion 220. In the instant embodiment, the first bent portion 210 and the second bent portion 220 are substantially in C-like shapes that open toward the same direction. That is to say, the first bent portion 210 and the second bent portion 220 extend across the same side surface and the bottom surface 1*b* of the magnetic base 1, but the present disclosure is not limited thereto. In another embodiment, the first bent portion 210 and the second bent portion 220 can open toward different directions, respectively. That is to say, the first bent portion 210 and the second bent portion 220 extend from different sides, such as two adjacent or opposite sides, of the magnetic base 1 to the bottom surface 1*b* of the magnetic base 1.

It is worth mentioning that in the embodiment shown in FIG. 2A, a width W1 of the middle portion 10 is greater than a width W2 of each of the extending wing portions 11, 12. That is to say, the middle portion 10 includes a protruding part (not denoted by any reference numerals) that protrudes from the side surfaces of the extending wing portions 11, 12. Accordingly, the extending wing portions 11, 12 and the protruding part can jointly form two recessed regions (not denoted by any reference numerals) at one of the side surfaces of the magnetic base 1, but the present disclosure is not limited thereto. The function of the protruding part will be described in the following descriptions, and will not be reiterated herein.

Figure 2B:
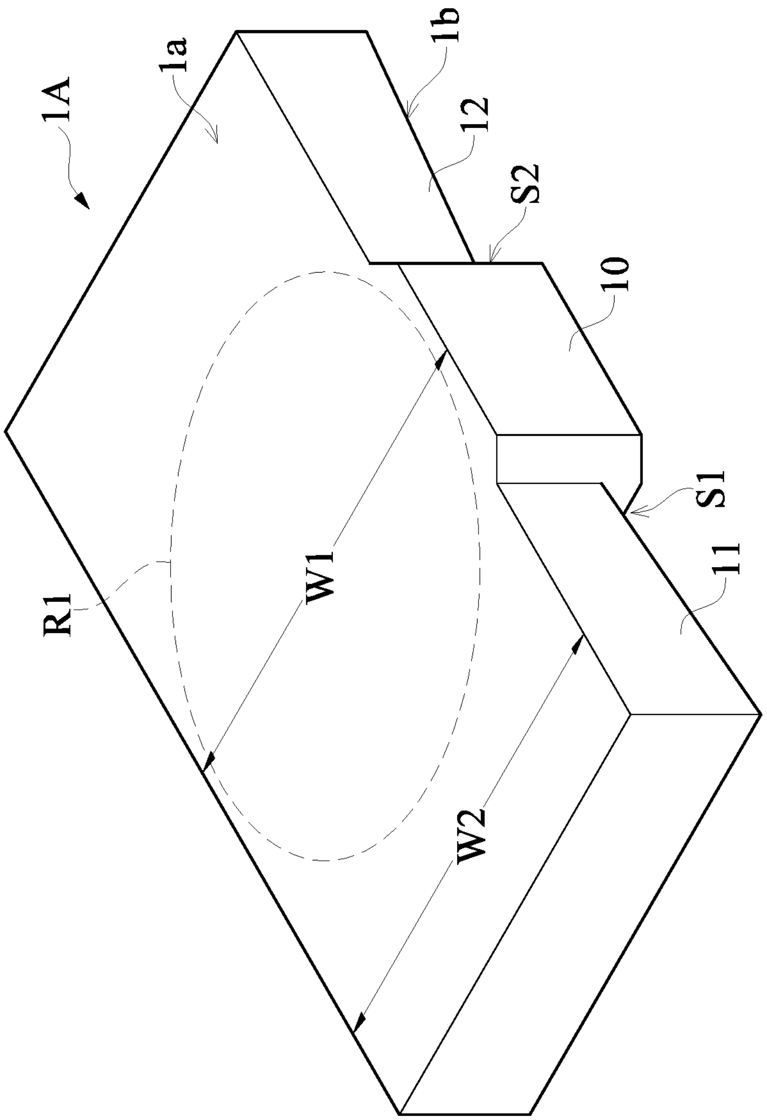
FIG. 2B is a schematic perspective view of a magnetic base according to another embodiment of the present disclosure.

Reference is made to FIG. 2B. In the magnetic base 1A of another embodiment, the middle portion 10 can include only one protruding part, and another end surface of the middle portion 10 is flush with the side surfaces of the extending wing portions 11, 12. The first bent portion 210 and the second bent portion 220 extend across a side surface of the magnetic base 1 having a step difference to the bottom surface 1*b* of the magnetic base 1. Accordingly, the first bent portion 210 and the second bent portion 220 are respectively located at two sides of the protruding part and then located in the two recessed regions. However, it is not necessary for the middle portion 10 of the embodiment of the present disclosure to have the protruding part. In other words, each of the two opposite end surfaces of the middle portion 10 can be flush with the side surfaces of the extending wing portions 11, 12.

Figure 4:
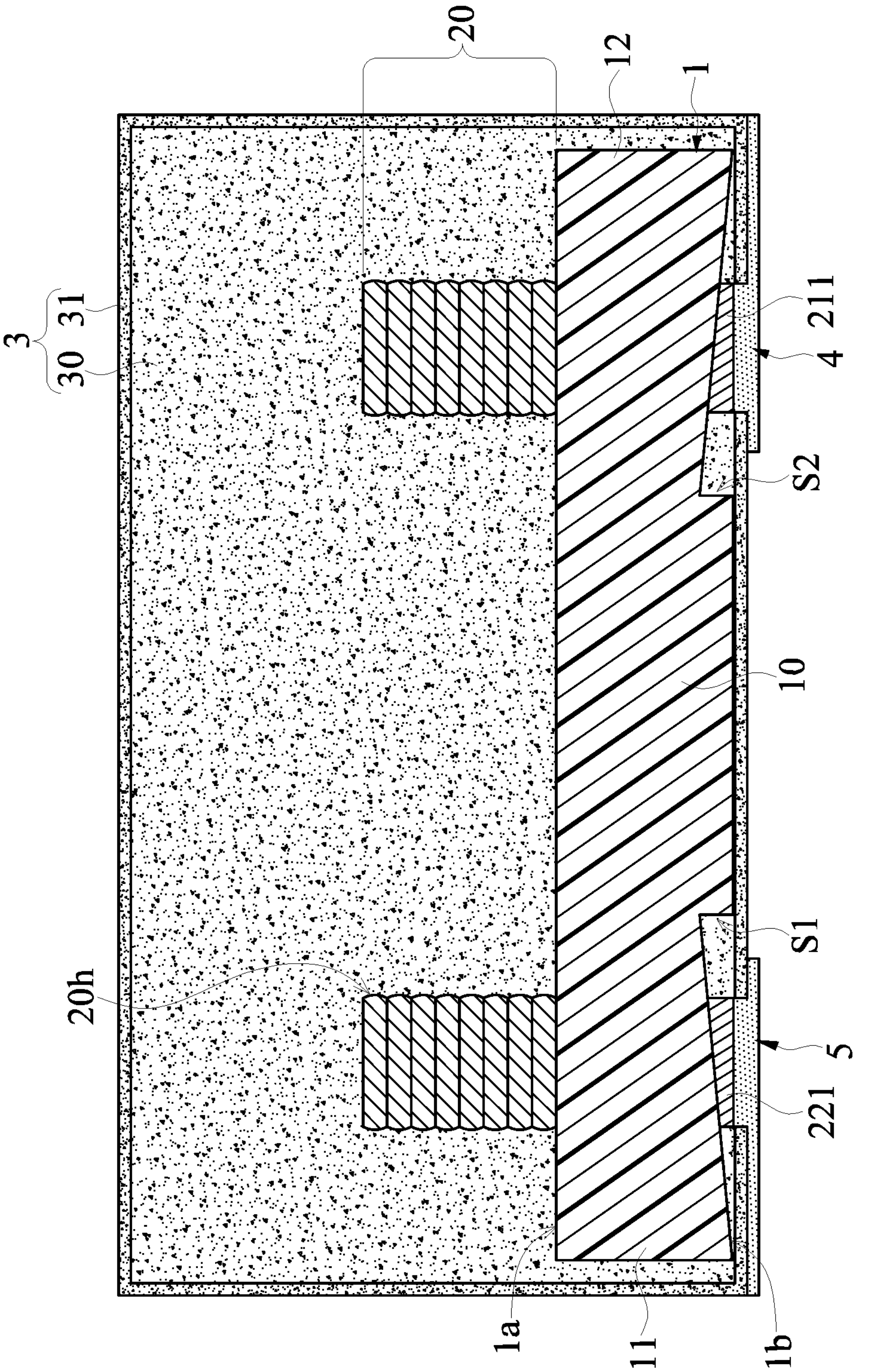
FIG. 4 is a schematic cross-sectional view of the inductive device according to the first embodiment of the present disclosure.

Reference is made to FIG. 3 and FIG. 4, in which FIG. 4 is a schematic cross-sectional view of the inductive device according to the first embodiment of the present disclosure. As mentioned previously, a height difference is formed between the bottom surface of the middle portion 10 and each of the bottom surfaces of the extending wing portions 11, 12 so as to form two stepped structures S1, S2. The first extending section 21 and the second extending section 22 can abut against the middle portion 10 by the stepped structures S1, S2, respectively. That is to say, by the bottom surface of the middle portion 10 protruding from the bottom surfaces of the extending wing portions 11, 12, the first extending section 21 and the second extending section 22 can be spaced apart from each other by the middle portion 10. As such, during the fabrication of the inductive device Z1, a situation where the first and second extending sections 21, 22 each move from a peripheral side (that is farther away from the middle portion 10) to a central side (that is closer to the middle portion 10) of either one of the extending wing portions 11, 12, and then are in contact with each other can be prevented. Accordingly, the fabrication yield of the inductive device Z1 can be increased.

Furthermore, it should be noted that in the instant embodiment, the first extending section 21 further includes a first terminal portion 211 that is connected to the first bent portion 210, and the second extending section 22 further includes a second terminal portion 221 that is connected to the second bent portion 220. The first terminal portion 211 and the second terminal portion 221 are both located at the bottom surface 1*b* of the magnetic base 1*b*.

Reference is made to FIG. 1, FIG. 3, and FIG. 4. The package structure 3 of the inductive device Z1 covers the magnetic base 1 and the coil structure 2. It is worth mentioning that since the magnetic base 1 does not have any core column, a portion of the package structure 2 fills into the through hole 20*h* of the coil body 20. Specifically, in one embodiment, the package structure 3 can include a magnetic molding main body 30 and an insulating layer 31 covering the magnetic molding main body 30. The magnetic molding main body 30 is made of a magnetic material and covers both the coil structure 2 and the magnetic base 1. A portion of the magnetic molding main body 30 fills into the through hold 20*h*. The insulating layer 31 covers the outer surface of the magnetic molding main body 30.

Since the magnetic base 1 of the instant embodiment does not have any core column, a part of the assembling surface 1*a* at the arrangement region R1 does not have any protrusion extending into the through hole 20*h* of the coil body 20. That is to say, a top end of the assembling surface 1*a* at the arrangement region R1 is not higher than the bottom-most loop of the coil body 20. Accordingly, in the instant embodiment, a portion of the magnetic molding main body 30 fills up the through hole 20*h* and is connected to the assembling surface 1*a* of the magnetic base 1.

In one embodiment, the material of the magnetic molding main body 30 basically includes a magnetic material. The aforementioned magnetic material can include at least one of crystalline magnetic metal powder and amorphous magnetic metal powder. The crystalline magnetic metal powder can be, for example, but not limited to, Fe—Si powder, Fe—Si—Cr powder, Fe—Si—Al powder, Fe—Ni powder, carbonyl iron (CIP) powder, iron powder, Fe—Ni—Mo powder, Fe—Co—V powder, or any combination thereof. The amorphous magnetic metal powder can be Fe-based amorphous magnetic metal powder, such as, FeSiBC, FeSiCrBPC, or any combination thereof, but the present disclosure is not limited thereto. The magnetic molding main body 30 is mainly made of the crystalline magnetic metal powder, such as, a material that is mixed with carbonyl iron powder, but the present is not limited the example provided herein. Furthermore, in another embodiment, the material of the part of the magnetic molding main body 30 that fills into the through hole 20*h* can be different from that of the magnetic base 1.

Furthermore, as shown in FIG. 3 and FIG. 4, the inductive device Z1 of the instant embodiment can further include a first electrode portion 4 and a second electrode portion 5 that are both located on the package structure 3. The first electrode portion 4 is electrically connected to the first terminal portion 211 of the first extending section 21, and the second electrode portion 5 is electrically connected to the second terminal portion 221 of the second extending section 22.

To be more specific, the first electrode portion 4 and the second electrode portion 5 respectively correspond to the positions of the first terminal portion 211 and the second terminal portion 221 and are formed on the package structure 3. Furthermore, as shown in FIG. 3 and FIG. 4, the first electrode portion 4 passes through the package structure 3 covering the bottom surface 1*b* of the magnetic base 1 and is physically connected to the inner conductive line of the first terminal portion 211. Similarly, the second electrode portion 5 passes through the package structure 3 covering the bottom surface 1*b* of the magnetic base 1 and is physically connected to the inner conductive line of the second terminal portion 221. In the instant embodiment, the first and second electrode portions 4, 5 are located at the same side of the package structure 3, which is convenient to dispose the inductive device Z1 on another circuit board (not shown) thorough surface mounting technology (SMT), but the present disclosure is not limited thereto.

Figure 5:
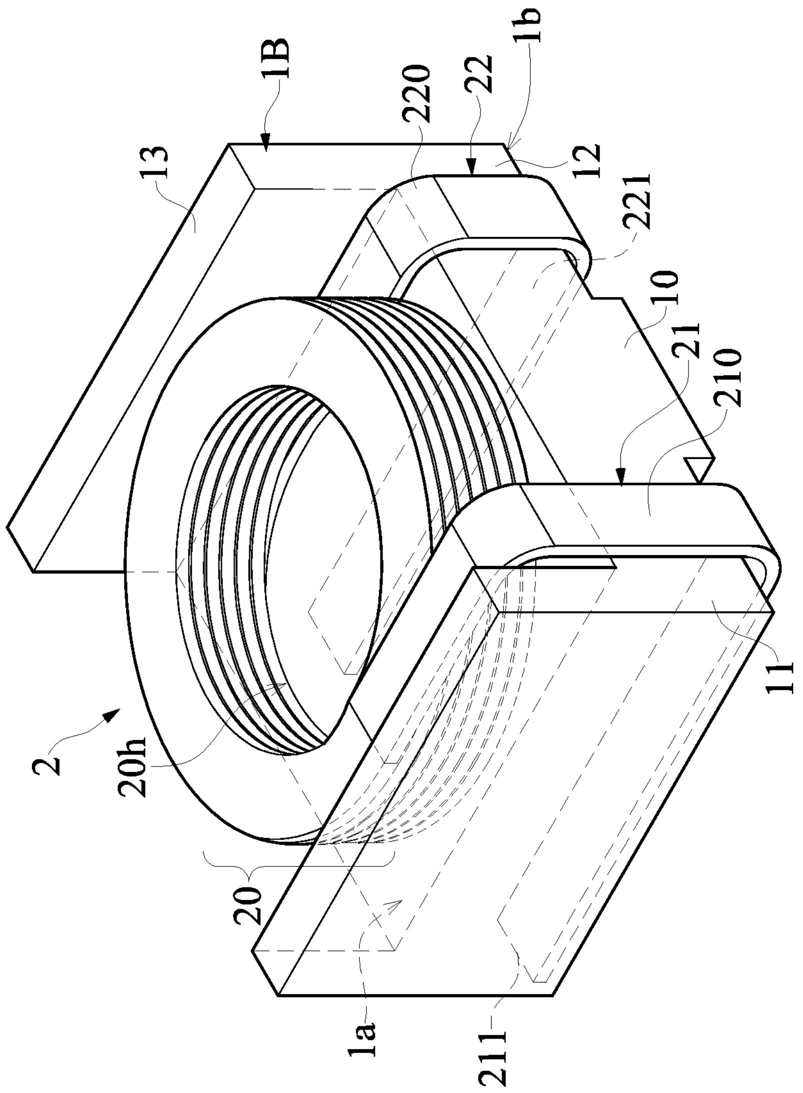
FIG. 5 is a schematic perspective view of an inductive device without illustrating the package structure according to a second embodiment of the present disclosure.
Figure 6:
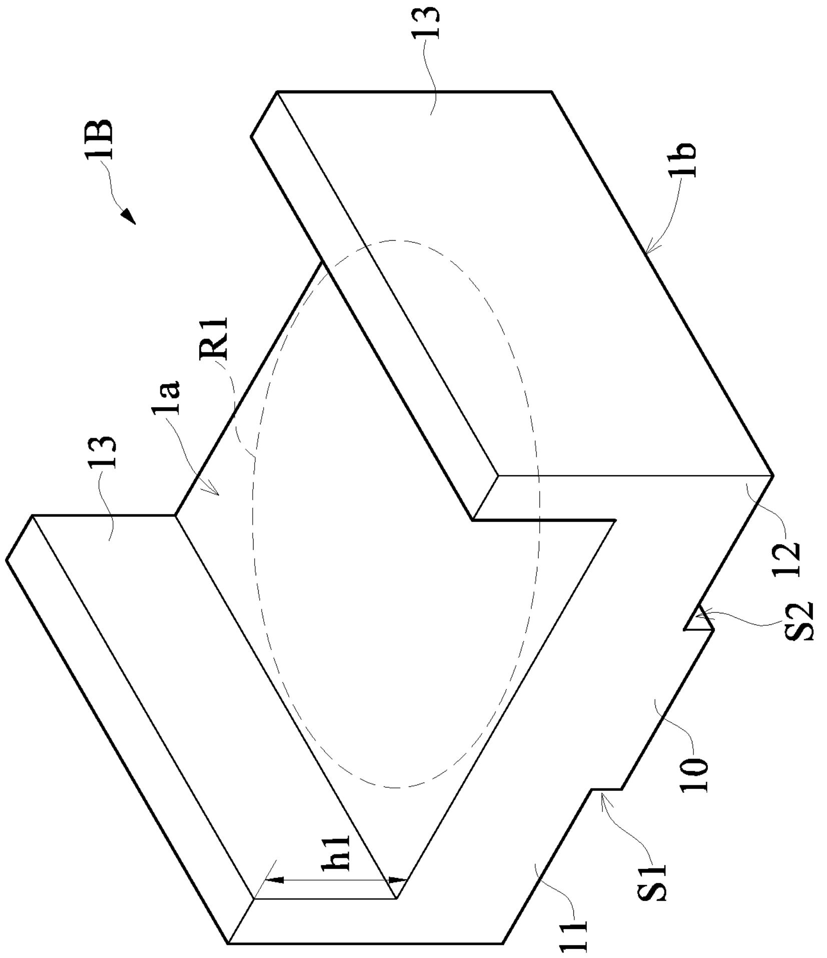
FIG. 6 is a schematic perspective view of a magnetic base according to the second embodiment of the present disclosure.
Figure 7:
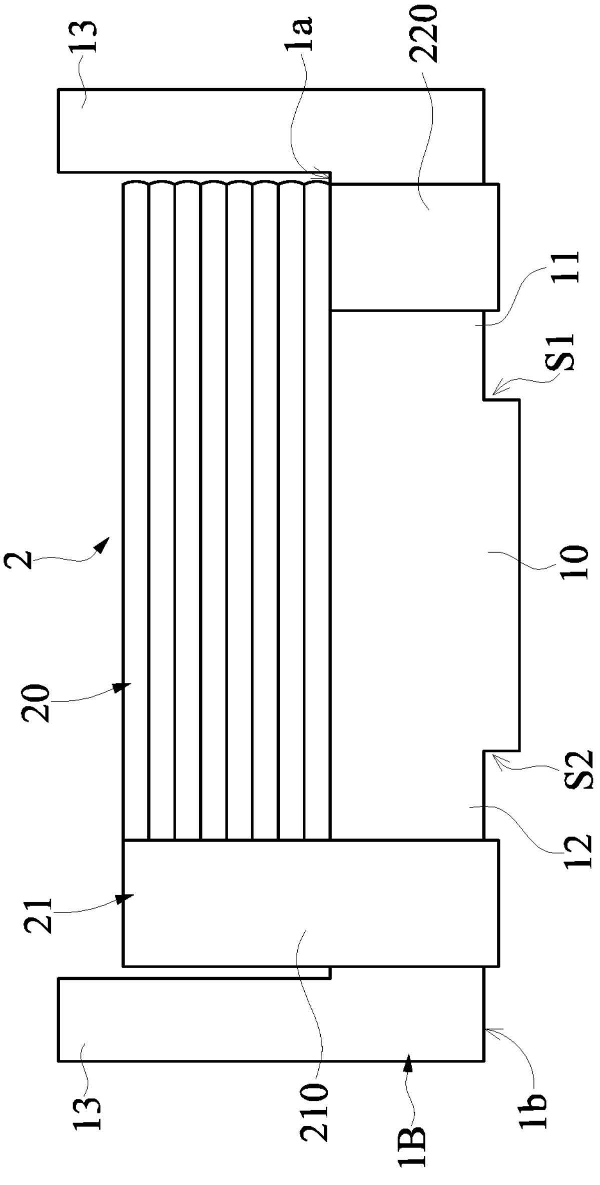
FIG. 7 is a schematic side view of the inductive device without illustrating the package structure according to the second embodiment of the present disclosure.

Reference is made FIG. 5 to FIG. 7. FIG. 5 is a schematic perspective view of an inductive device without illustrating the package structure according to a second embodiment of the present disclosure, and FIG. 6 is a schematic perspective view of a magnetic base according to the second embodiment of the present disclosure. Moreover, FIG. 7 is a schematic side view of the inductive device without illustrating the package structure according to the second embodiment of the present disclosure. The components or elements of the instant embodiment which are similar or the same as those of the first embodiment are denoted by similar or the same reference numerals, as and will not be reiterated herein.

As shown in FIG. 6, the magnetic base 1B of the instant embodiment is also a coreless magnetic base. However, the magnetic base 1B includes two lateral retaining walls 13 disposed on the assembling surface 1*a* and spaced apart from each other. Specifically, the two lateral retaining walls 13 protrude from the assembling surface 1*a* so as to define the arrangement region R1. Furthermore, the lateral retaining walls 13 are separate and jointly define at least one gap therebetween (that is not denoted by any reference numerals and two gaps shown in FIG. 6 are exemplary).

As shown in FIG. 5 and FIG. 7, the coil body 20 of the coil structure 2 is located between the two lateral retaining walls 13. Referring to FIG. 6, which is to be read in conjunction with FIG. 7, in the instant embodiment, each of the lateral retaining walls 13 protrudes the assembling surface 1*a* and has a height h1 relative to the assembling surface 1*a*. The height h1 of each of the lateral retaining walls 13 is greater than that of the coil body 20 relative to the assembling surface 1*a*, but the present disclosure is not limited thereto. In another embodiment, the height h1 of the lateral retaining wall 13 may be less than that of the coil body 20 relative to the assembling surface 1*a*.

In the instant embodiment, the first extending section 21 and the second extending section 22 pass through the same gap so as to extend to the bottom surface 1*b* of the magnetic base 1B, but the present disclosure is not limited thereto. In another embodiment, the first and second extending sections 21, 22 can respectively pass through different gaps located at different sides of the magnetic base 1B to extend to the bottom surface 1*b* of the magnetic base 1B.

Furthermore, referring to FIG. 7, in the instant embodiment, each of the extending wing portions 11, 12 has substantially the same thickness along the direction away from the middle portion 10. It should be noted that compared to the magnetic base 1 of the first embodiment, the magnetic base 1B of the instant embodiment includes the lateral retaining walls 13, which is used to not only position and hold the coil structure 2, but restrict the positions of the first and second extending sections 21, 22. As such, in the instant embodiment, despite the thickness of each of the extending wing portions 11, 13 being substantially the same, the first and second extending sections 21, 22 of the coil structure 2 can be prevented from sliding outwards from the middle portion 10 and being loosed.

However, in another embodiment, the extending wing portions 11, 12 of the magnetic base 1B can each have similar shape to that of the extending wing portions 11, 12 of the magnetic base 1 in the first embodiment. Therefore, each of the extending wing portions 11, 12 of the magnetic base 1B can be substantially in a wedge shape to fix the positions of the first and second extending sections 21, 22, but the present disclosure is not limited thereto.

Furthermore, as shown in FIG. 7, similar to the magnetic base 1 of the first embodiment, the bottom surfaces of the extending wing portions 11, 12 of the magnetic base 1B in the instant embodiment is recessed relative to the bottom surface of the middle portion 10 so as to form two stepped structures S1, S2. The first terminal portion 211 of the first extending section 21 and the second terminal portion 221 of the second extending section 22 that are located at the bottom surface 1*b* of the magnetic base 1B can be engaged with the two stepped structures S1, S2, respectively, and spaced apart from each other by the middle portion 10 to prevent short circuit.

However, different from the embodiments shown in FIG. 2A and FIG. 2B, the middle portion 10 of the magnetic base 1B does not have protruding part. That is to say, in the magnetic base 1B, each of the end surfaces of the middle portion 10 is flush with the side surfaces of the extending wing portions 11, 12, but the instant embodiment is not limited thereto. The magnetic base 1B can also have at least one protruding part so that two step differences (not denoted by any reference numerals) are formed at one of the side surfaces of the magnetic base 1B.

Figure 8:
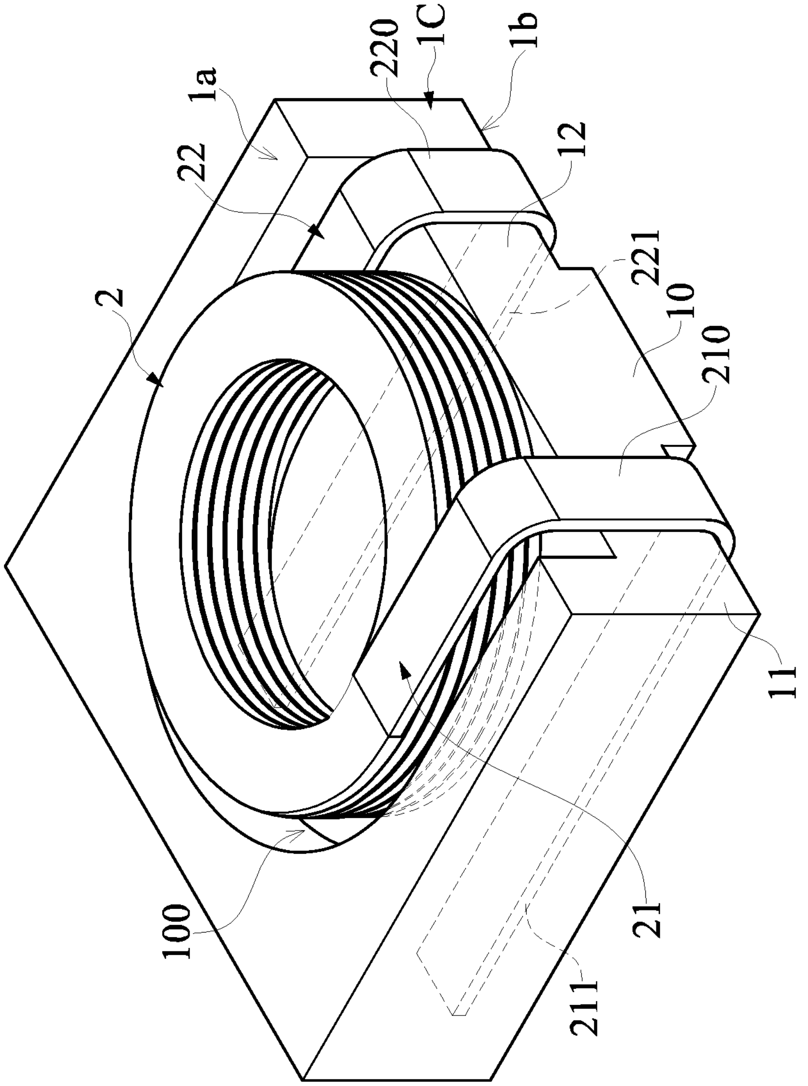
FIG. 8 is a schematic perspective view of an inductive device without illustrating the package structure according to a third embodiment of the present disclosure.
Figure 9:
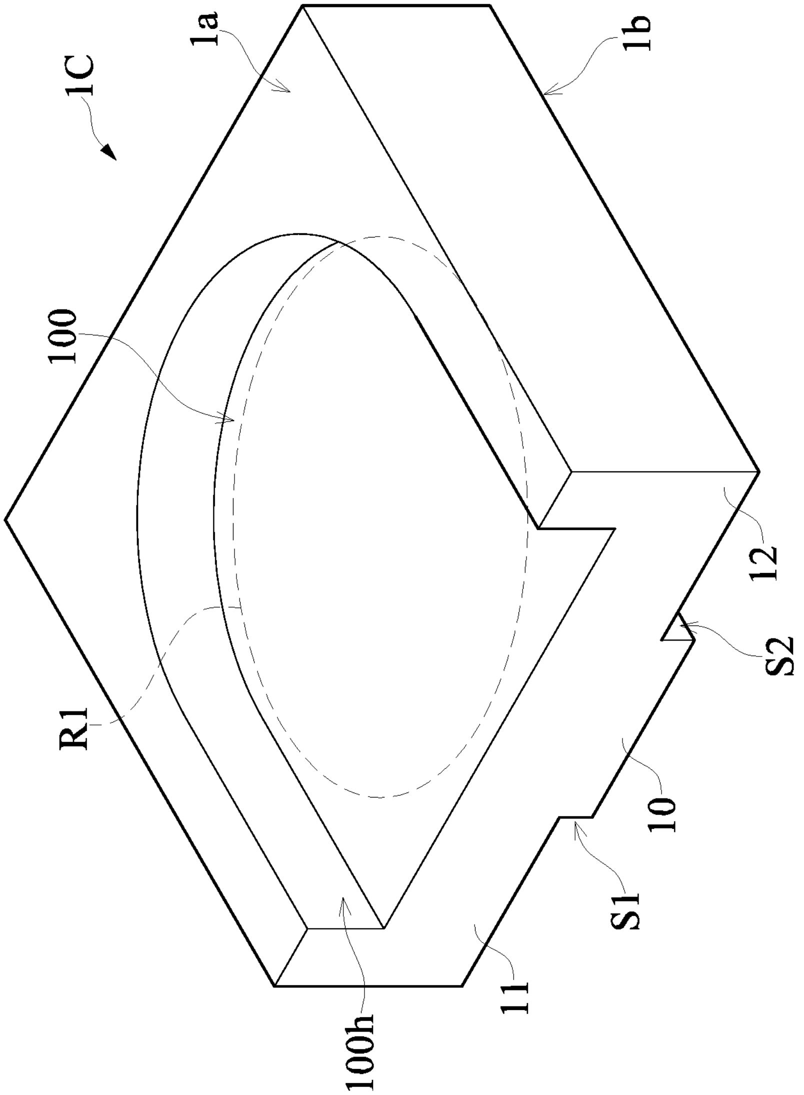
FIG. 9 is a schematic perspective view of a magnetic base according to the third embodiment of the present disclosure.
Figure 10:
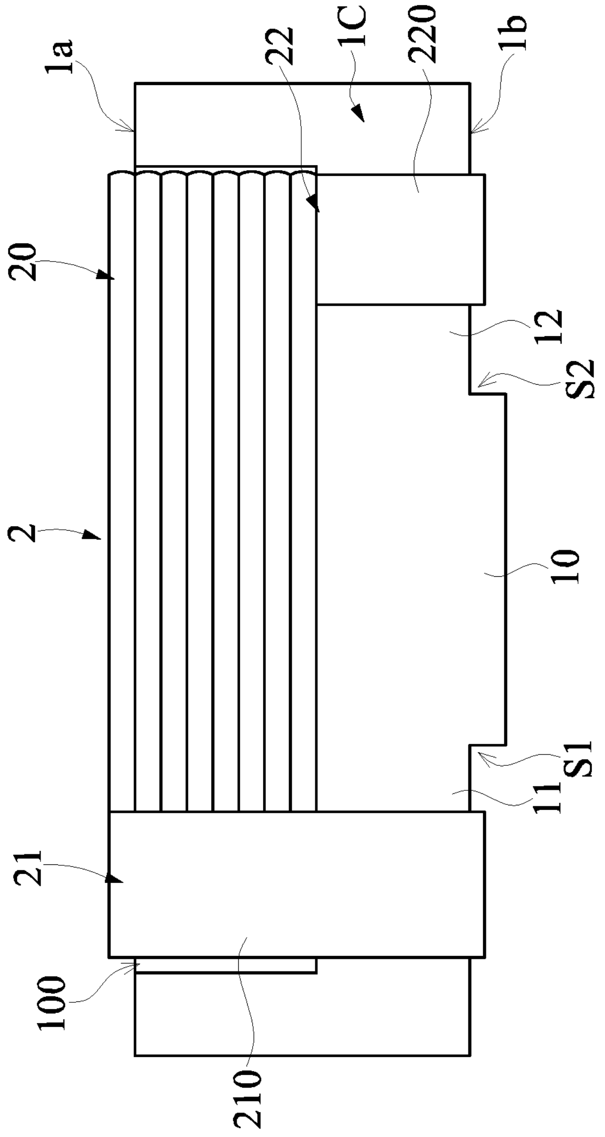
FIG. 10 is a schematic side view of the inductive device without illustrating the package structure according to the third embodiment of the present disclosure.

Reference is made to FIG. 8 to FIG. 10. FIG. 8 is a schematic perspective view of an inductive device without illustrating the package structure according to a third embodiment of the present disclosure, and FIG. 9 is a schematic perspective view of a magnetic base according to the third embodiment of the present disclosure. Furthermore, FIG. 10 is a schematic side view of the inductive device without illustrating the package structure according to the third embodiment of the present disclosure. The components or elements of the instant embodiment which are similar or the same as those of the first embodiment are denoted by similar or the same reference numerals, as and will not be reiterated herein.

Reference is made to FIG. 8 and FIG. 9. The magnetic base 1C has a recessed portion 100 that is recessed inwardly from the assembling surface 1*a*. That is to say, in the instant embodiment, the assembling surface 1*a* is an uneven surface, and the arrangement region R1 is located at the bottom of the recessed portion 100.

Furthermore, as shown in FIG. 9, in the instant embodiment, an inner wall of the recessed portion 100 has a contour that is substantially complements a part of a side surface contour of the coil body 20. Accordingly, the inner wall is a curved surface. The inner wall of the recessed portion 100 further has an opening 100*h*, such that the inner wall of the recessed portion 100 is substantially in C shape from a top view. That is to say, the recessed portion 100 extends from a central region of the magnetic base 1C across one of side edges of the magnetic base 1C. Similar to the magnetic base 1 shown in FIG. 2A, the bottom surface of the middle portion 10 of the magnetic base 1C in the instant embodiment protrudes from the bottom surfaces of the extending wing portions 11, 12 that are respectively located at two opposite sides of the middle portion 10 so as to form two stepped structures S1, S2.

Accordingly, referring to FIG. 8 again, the coil structure 2 of the instant embodiment is located in the recessed portion 100 and can be held by the inner wall of the recessed portion 100. Specifically, the coil body 20 is located in the arrangement region R1 defined by the recessed portion 100, and the first extending section 21 and the second extending section 22 pass through the opening 100*h*, extend out of the recessed portion 100, and are fixed at a bottom surface 1*b* of the magnetic base 1C.

That is to say, the first extending section 21 extends from the coil body 20 toward the opening 100*h* to the bottom surface 1*b* of the magnetic base 1C and is engaged with one of the stepped structures S1, S2. The second extending section 22 extends from the bottom of the coil body 20 along the bottom surface of the recessed portion 100 toward the opening 100*h* to the bottom surface 1*b* of the magnetic base 1C, and is engaged with another one of the stepped structure S1, S2.

Accordingly, compared to the magnetic base 1 shown in FIG. 2A, the magnetic base 1C of the instant embodiment includes a recessed portion 100 so that the coil structure 2 can be positioned, and the positions of the first and second extending sections 21, 22 can be restricted. Furthermore, the first terminal portion 211 of the first extending section 21 and the second terminal portion 221 of the second extending section 22 that are both located at the bottom surface 1*b* of the magnetic base 1C can be respectively engaged with the stepped structures S1, S2 and spaced apart from each other by the middle portion 10 so as to prevent short circuit between the first and second terminal portions 211, 221.

In the instant embodiment, the middle portion 10 of the magnetic base 1C does not have any protruding part. Accordingly, any one of end surfaces of the middle portion 10 is flush with the side surfaces of the extending wing portions 11, 12, but the instant embodiment is not limited thereto. In another embodiment, the middle portion 10 of the magnetic base 1C can have a protruding part, and the protruding part and the opening 100*h* are located at the same side of the magnetic base 1C.

As mentioned previously, since each of the magnetic bases 1, 1A, 1B, 1C provided in the embodiments of the present disclosure does not include any core column, the size of the coil body 20 of the coil structure 2 is not limited to the size of the core column, and can be designed according to practical requirements, which allows the inductive device Z1 to be more flexibly designed. Furthermore, compared to the conventional magnetic core, the magnetic bases 1, 1A, 1B, 1C provided in the embodiments of the present disclosure can be adapted to fabricate different kinds of coil structures 2. That is to say, it is not necessary for the magnetic bases 1, 1A, 1B, 1C to be redeveloped even though the size of the coil body 20 is changed, and the fabrication cost can be significantly saved.

Figure 11:
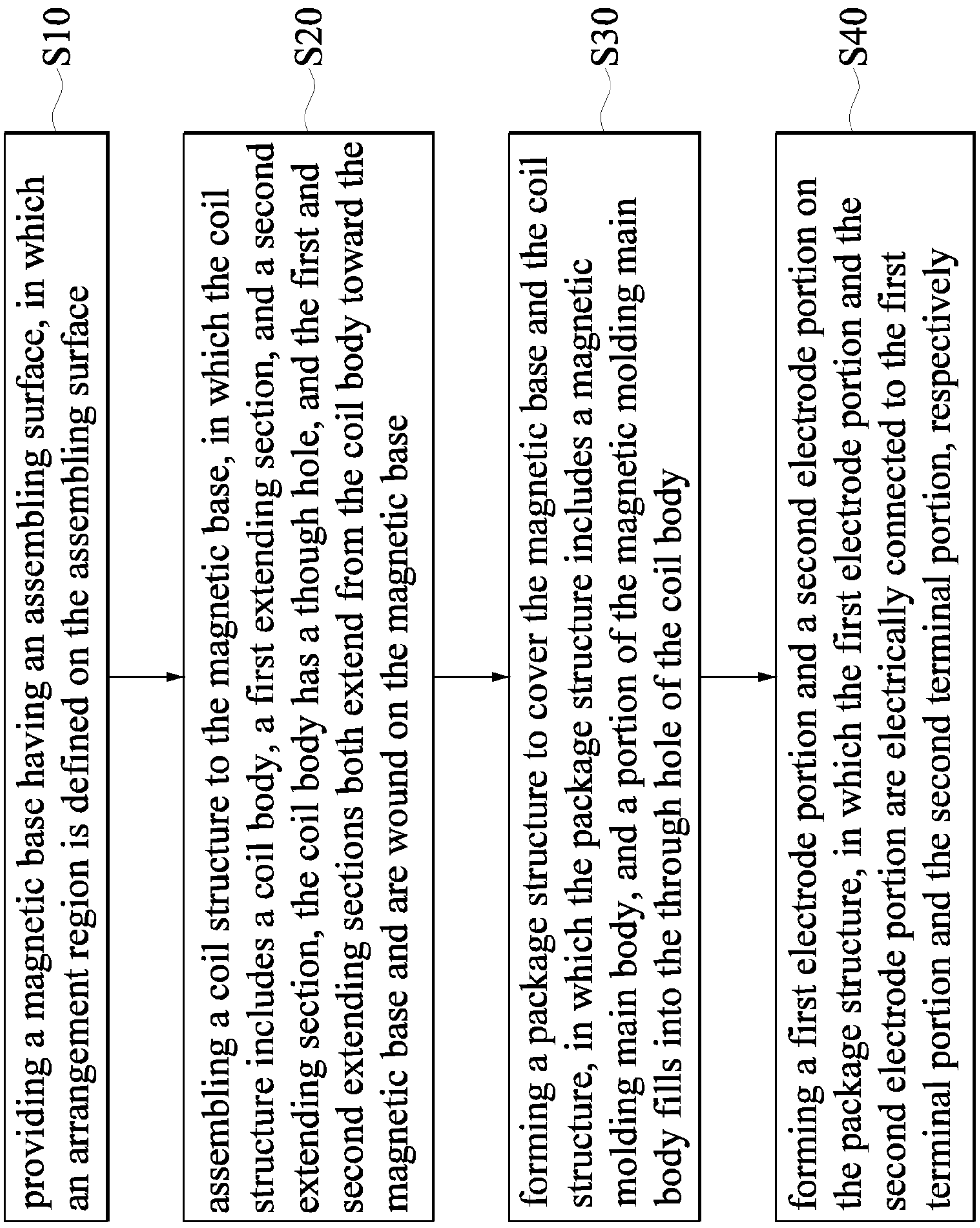
FIG. 11 is a flowchart of a manufacturing method of an inductive device according to an embodiment of the present disclosure.

In the present disclosure, a manufacturing method of an inductive device is provided. By performing the manufacturing method, the abovementioned inductive device Z1 can be fabricated, but the present disclosure is not limited thereto. Reference is made to FIG. 11, which is a flowchart of a manufacturing method of an inductive device according to an embodiment of the present disclosure.

Specifically, in step S10, a magnetic base is provided, in which the magnetic base has an assembling surface and a bottom surface opposite to the assembling surface, and an arrangement region is defined on the assembling surface. The magnetic base can be, for example, any one of the magnetic bases 1, 1A, 1B, 1C that are illustrated in FIG. 2A, FIG. 2B, FIG. 6, and FIG. 9, respectively, but the present is not limited thereto. In the instant embodiment, the magnetic base 1 shown in FIG. 2A is exemplified for describing the manufacturing method of the embodiment in the present disclosure. As mentioned previously, any one of the magnetic bases 1, 1A, 1B, 1C does not include any core column. The detailed structures of the magnetic bases 1, 1A, 1B, 1C can refer to the previous descriptions, and will not be reiterated herein.

In step S20, a coil structure is assembled to the magnetic base, in which the coil structure includes a coil body, a first extending section, and a second extending section, the coil body has a though hole, and the first and second extending sections both extend from the coil body toward the magnetic base and are wound on the magnetic base.

Figure 12:
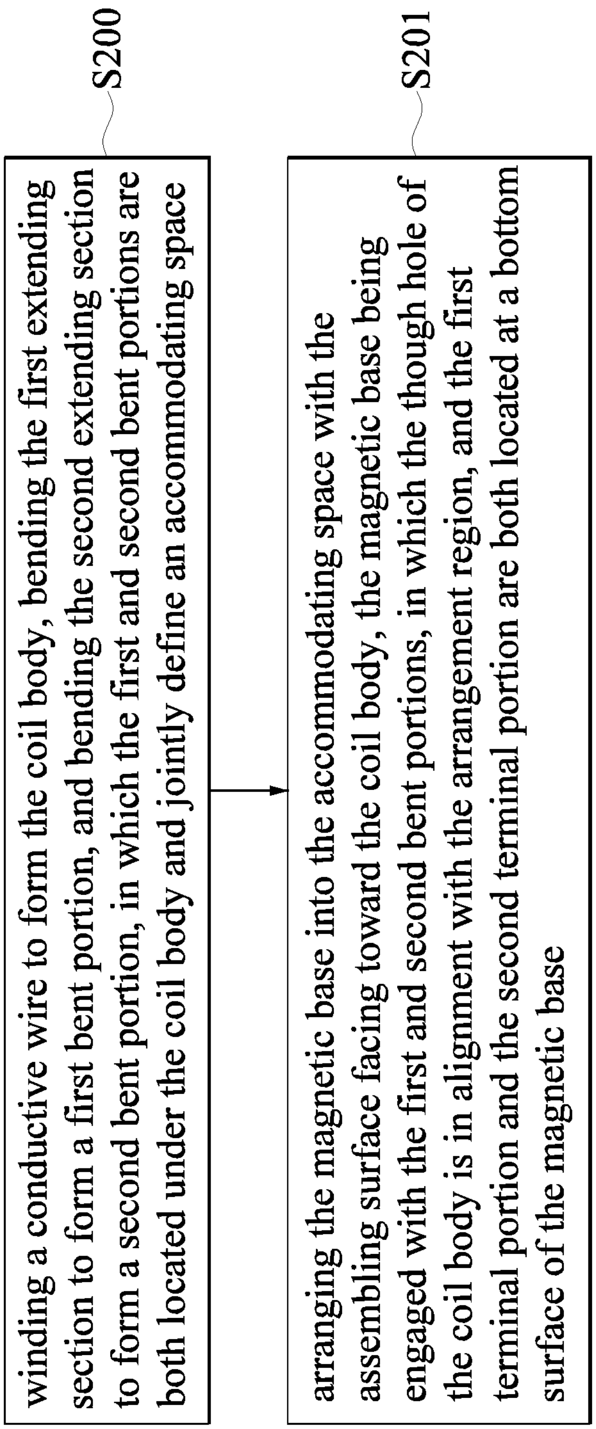
FIG. 12 is a flowchart of the step S20 of the manufacturing method according to the embodiment of the present disclosure.
Figure 13:
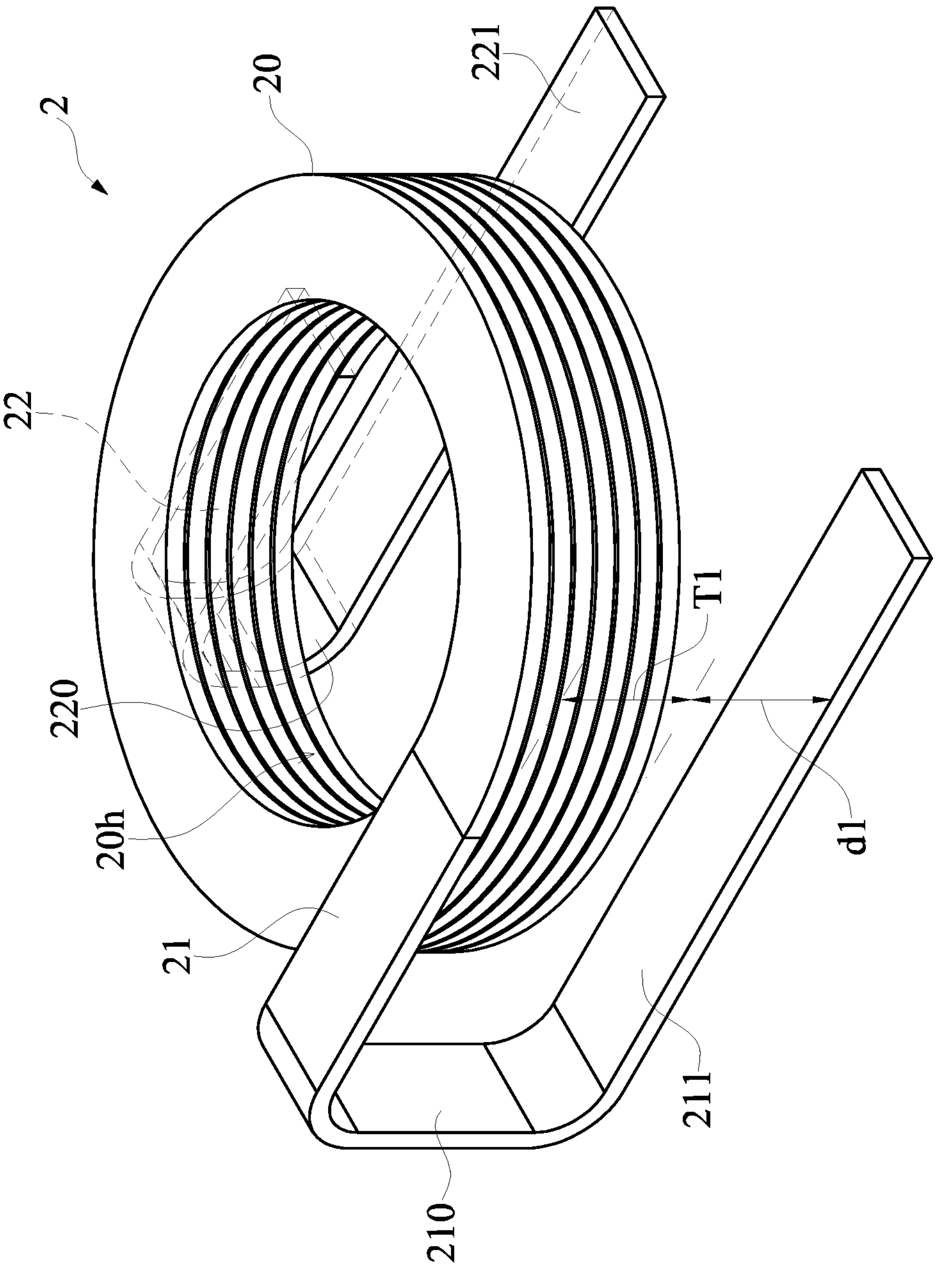
FIG. 13 is a schematic view illustrating step S200 of the manufacturing method shown in FIG. 12 according to the embodiment of the present disclosure.

In one embodiment, the coil structure 2 can be assembled to the magnetic base 1 after the coil structure 2 is fabricated. Reference is made to FIG. 12 and FIG. 13. FIG. 12 is a flowchart of the step S20 of the manufacturing method according to the embodiment of the present disclosure, and FIG. 13 is a schematic view illustrating step S200 shown in FIG. 12 according to the embodiment of the present disclosure.

Referring to FIG. 13, which is to be read in conjunction with the step S200 shown in FIG. 12, a conductive wire can be wound to form the coil body 20, and then the first extending section 21 and the second extending section 22 are bent to respectively form a first bent portion 210 and a second bent portion 220. The first and second bent portions 210, 220 are located under the coil body 20 and jointly define an accommodating space. In the instant embodiment, the first extending section 21 and the second extending section 22 are bent toward the same direction to for the first bent portion 210 and the second bent portion 220. Furthermore, the first extending section 21 further includes a first terminal portion 211 that is connected to the first bent portion 210, and the second extending section 22 includes a second terminal portion 221 that is connected to the second bent portion 220.

Figure 14:
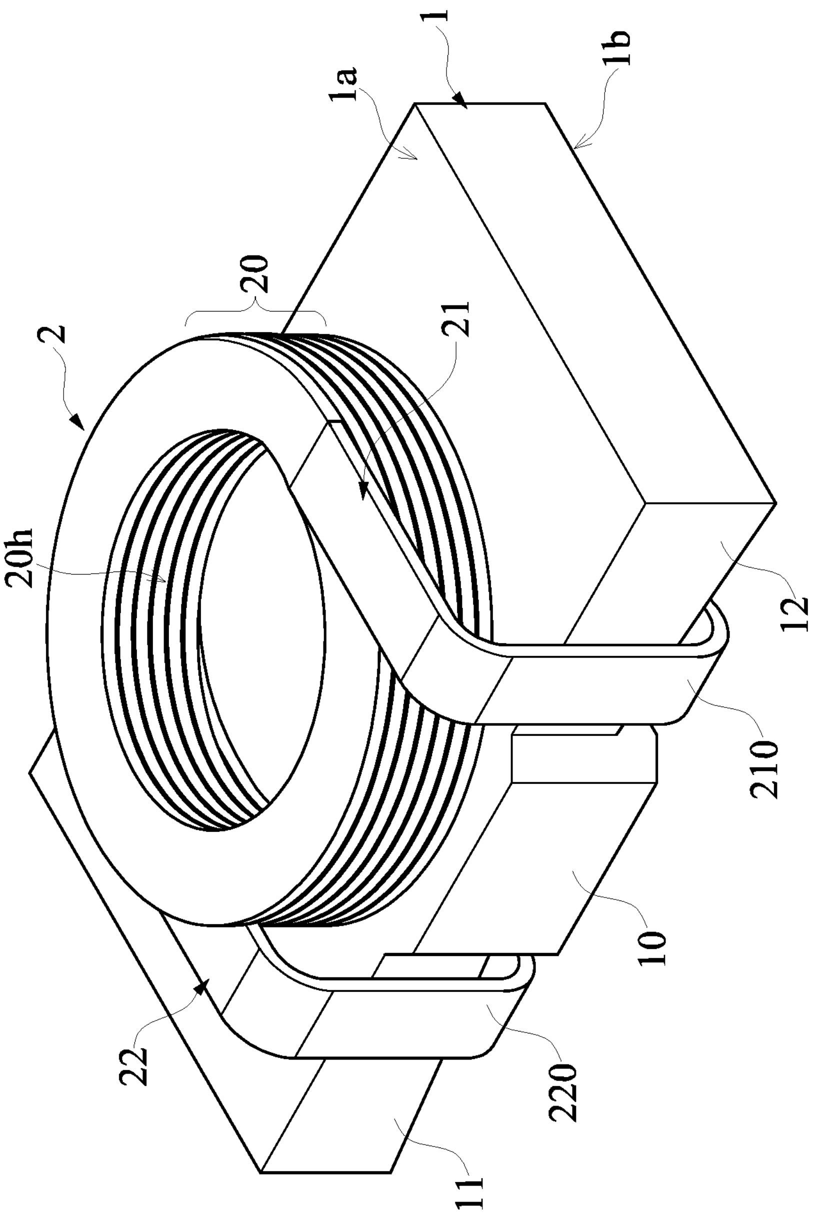
FIG. 14 is a schematic view illustrating step S201 of the manufacturing method shown in FIG. 12 according to the embodiment of the present disclosure.

Reference is made to FIG. 12, which is to be read in conjunction with FIG. 14. FIG. 14 is a schematic view illustrating step S201 of the manufacturing method shown in FIG. 12 according to the embodiment of the present disclosure. As shown in FIG. 14 and described in step S201, the magnetic base 1 is arranged into the accommodating space with the assembling surface 1*a* facing toward the coil body 20, the magnetic base 1 being engaged with the first and second extending sections 210, 220. Furthermore, the arrangement region R1 is arranged to correspond in position to the though hole 20*h* of the coil body 20. The first terminal portion 211 of the first extending section 21 and the second terminal portion 221 of the second extending section 22 are both located at a bottom side of the magnetic base 1

Reference is made to FIG. 13 and FIG. 14. It should be noted that in the instant embodiment, a vertical distance d1 between a bottom end of the coil body 20 and the first terminal portion 211 (or the second terminal portion 221) is greater than a smallest thickness t1 of the extending wing portion 11 (or the extending wing portion 12) of the magnetic base 1 (i.e., d1>t1). As such, during the step S201, the magnetic base 1 is easily inserted into the accommodating space defined between the coil body 20 and the first terminal portion 211 (or the second terminal portion 221). However, the vertical distance d1 between the bottom end of the coil body 20 and the first terminal portion 211 (or the second terminal portion 221) is less than a largest thickness t2 of the extending wing portion 11 (or the extending wing portion 12) of the magnetic base 1 (i.e., d1<t2). As such, the first and second extending sections 21, 22 can be prevented from sliding outwards from the middle portion 10 and being loosed.

However, in another embodiment, the coil structure 2 can be directly formed on the magnetic base 1. To be more specific, the step of assembling the coil structure 2 to the magnetic base 1 can include the steps of: forming the coil body 20 by winding a conductive wire, and forming the first extending section and the second extending section without winding two end portions of the conductive wire, respectively. That is, a conductive wire is wound on the assembling surface 1*a* of the magnetic base 1, so that a coil body 20 is formed and located in the arrangement region R1. Meanwhile, the two end portions of the conductive wire, i.e., the first extending section 21 and the second extending section 22, are not wound yet. Thereafter, the first and second extending sections 21, 22 are bent toward the bottom surface 1*b* of the magnetic base 1 so as to fix the coil body to the magnetic base 1.

In another embodiment, a semi-finished coil structure 2 can be provided and assembled to the magnetic base 1, and then the fabrication processes of the coil structure 2 proceeds to be performed. Specifically, a conductive wire is wound to form the semi-finished coil structure 2, which includes the coil body 20, the first extending section 21, and the second extending section 22, in which the first and second extending sections 21, 22 are not wound yet. Thereafter, the coil body 20 is arranged on the magnetic base 1 with the through hole 20*h* corresponding in position to the arrangement region R1. The first and second extending sections 21, 22 are bent toward the bottom surface 1*b* of the magnetic base 1 so that the coil structure 2 can be fixed to the magnetic base 1.

It is worth mentioning that the core column in the present disclosure is a column structure on which a conductive wire can be wound to form the coil body 20, instead of an alignment post for assisting the coil structure corresponding in position to the arrangement region R1. Accordingly, in another embodiment, the magnetic base 1 may include an alignment post located in the arrangement region R1 even though the alignment posit is not illustrated in the figures of the present disclosure. However, the diameter of the alignment post is less than the diameter of the through hole 20*h* of the coil body 20, or a height of the alignment post relative to the assembling surface 1*a* can be less than a height T1 of the coil body 20 relative to the assembling surface 1*a*. That is to say, the alignment post is used only for assisting a fixture to position the coil body 20, instead of limiting the size of the coil body 20.

Reference is made to FIG. 11. In step S30, a package structure is formed to cover the magnetic base and the coil structure, in which the package structure includes a magnetic molding main body, and a portion of the magnetic molding main body fills into the through hole of the coil body. In one embodiment, the magnetic molding main body can be formed by a compression molding process, and the magnetic molding main body encapsulates the coil body and the magnetic base and fills into the through hole.

Figure 15:
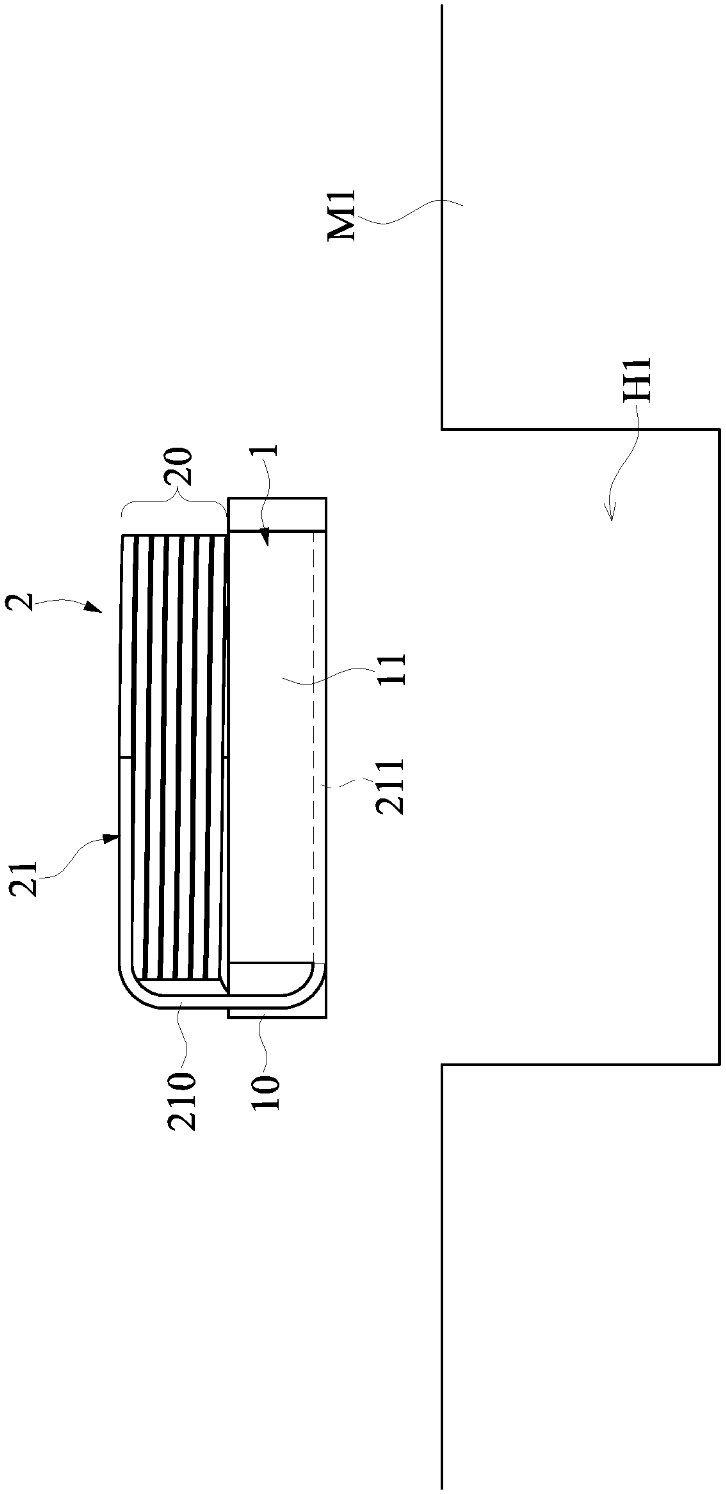
FIGS. 15-19 are schematic views illustrating step S30 in which a package structure is formed according to the embodiment of the present disclosure.

Reference is made to FIG. 15 to FIG. 19, which respectively show the inductive device in different steps of the compression molding process according to an embodiment of the present disclosure. As shown in FIG. 15, the coil structure 2 and the magnetic base 1 that have been assembled to each other are placed into a cavity H1 of a mold M1.

Figure 16:
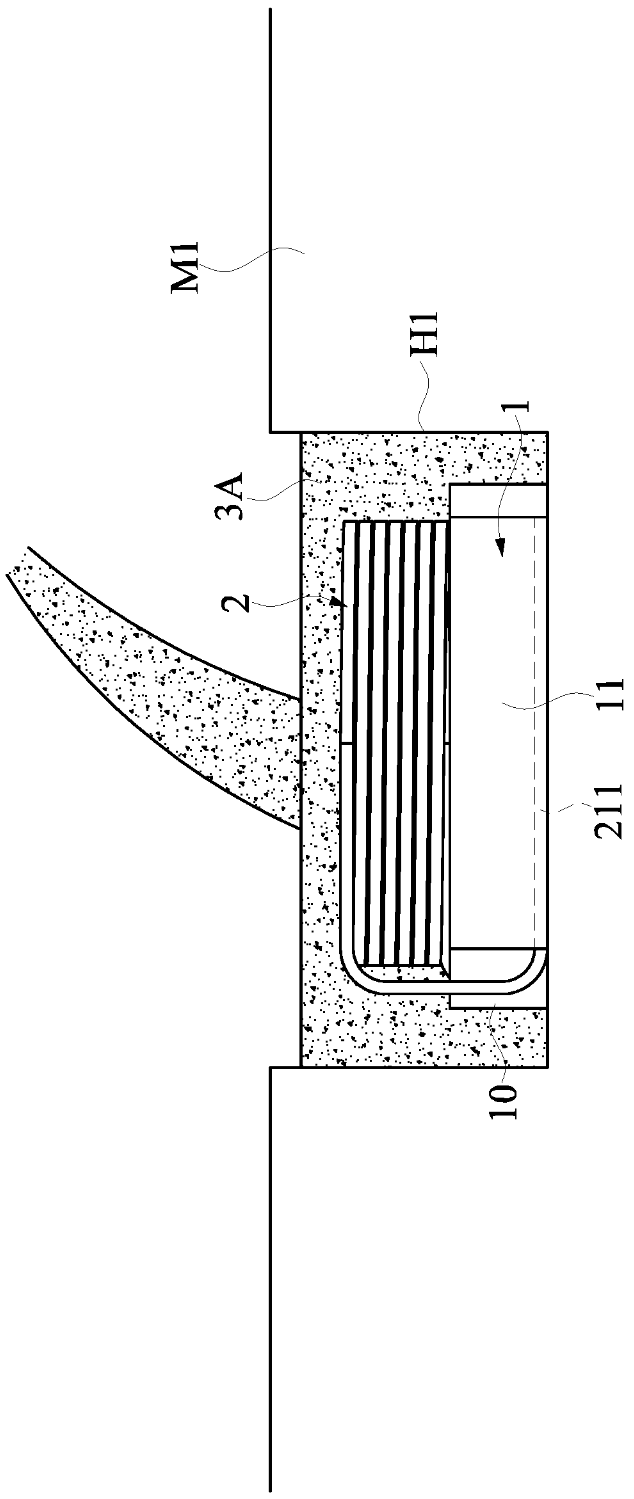

As shown in FIG. 16, the cavity H1 is filled with a powder 3A for forming an initial package body. The aforementioned powder 3A can include only magnetic powder or include both magnetic powder and non-magnetic powder. In one embodiment, the particle size of the magnetic powder ranges from 0.1 μm to 200 μm. It should be noted that in this step, the aforementioned powder 3A can fill in the through hole 20*h* of the coil body 20.

Figure 17:
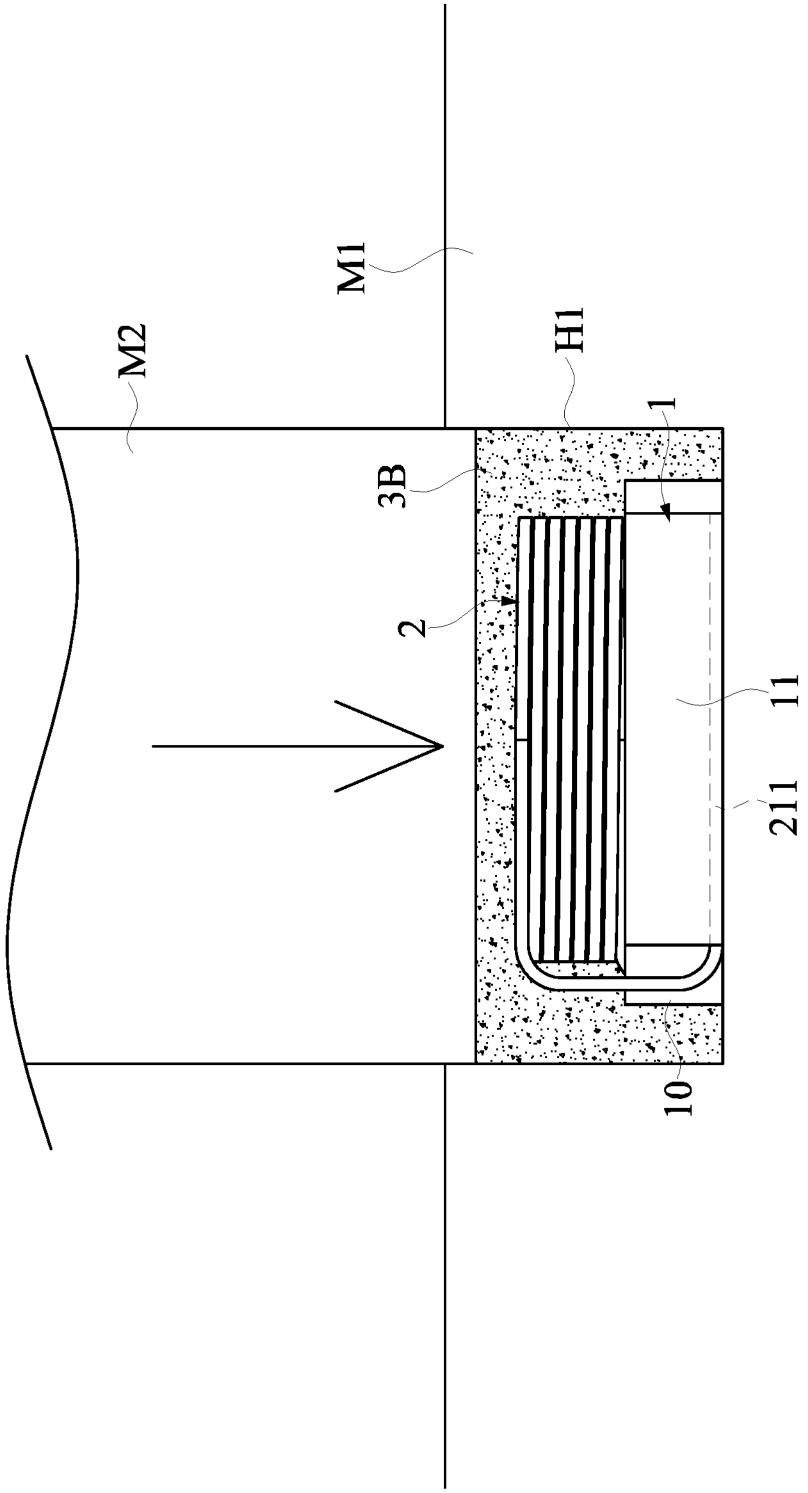
Figure 18:
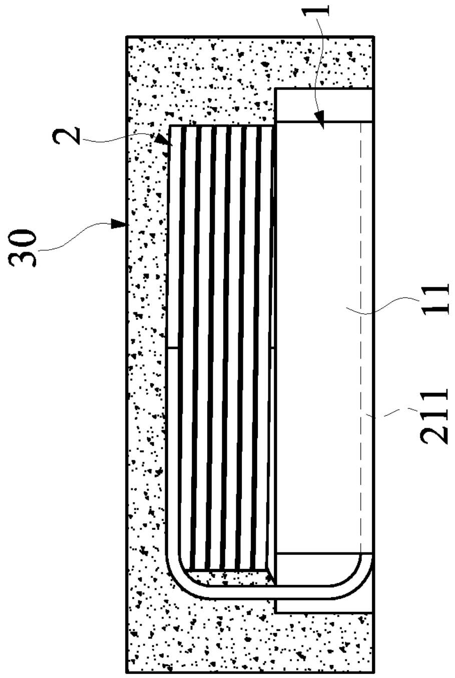

Reference is made to FIG. 17. A punching machine M2 is used to compress the powder 3A that fills in the cavity H1, so that the powder 3A encapsulates the coil structure 2 and the magnetic base 1 and an initial package body 3B can be formed. A pressure applied to the powder 3A by the punching machine M2 forces the powder 3A to be squeezed and fill the gaps between the coil structure 2 or the magnetic base 1 and the lateral walls of the cavity H1. Reference is made to FIG. 18. After fabricated, the initial package body 3B is taken out of the mold M1.

Furthermore, in the manufacturing method of the instant embodiment, after the initial package body 3B is taken out of the mold M1, a heat treatment, such as an annealing process, can be performed on the initial package body 3B so that the initial package body 3B can be further cured to form the magnetic molding main body 30. The magnetic molding main body 30 has a portion filling into the through hole 20*h* of the coil body 20.

The magnetic molding main body 30 and the magnetic base 1 can be made of material selecting from any one of crystalline magnetic metal powder, amorphous magnetic metal powder, and the combination thereof. As mentioned previously, the crystalline magnetic metal powder can be, for example, but not limited to, Fe—Si powder, Fe—Si—Cr powder, Fe—Si—Al powder, Fe—Ni powder, carbonyl iron (CIP) powder, iron powder, Fe—Ni—Mo powder, Fe—Co—V powder, or any combination thereof. The amorphous magnetic metal powder can be Fe-based amorphous magnetic metal powder, such as, FeSiBC, FeSiCrBPC, or any combination thereof, but the present disclosure is not limited thereto.

It should be noted that when the magnetic molding main body 30 and the magnetic base 1 are made of the same material, the magnetic molding main body 30 and the magnetic base 1 are combined with each other and integrated into one piece after performing the abovementioned punching step and the heat treatment. In another embodiment, the magnetic molding main body 30 and the magnetic base 1 can be respectively made of different materials. Specifically, the materials of the magnetic molding main body 30 and the magnetic base 1 can include different kinds of magnetic materials, respectively. For example, the magnetic molding main body 30 can be made of the crystalline magnetic metal powder, such as, a material that is mixed with carbonyl iron powder, and the magnetic base 1 can be made of Fe—Si—Cr powder, but the present disclosure is not limited to the examples provided herein.

It is worth mentioning that the middle portion 10 of the magnetic base 1 has a protruding portion. As shown in FIG. 16 and FIG. 17, the protruding portion of the middle portion 10 protrudes from the first and second bent portions 210, 220 in a horizontal direction. Accordingly, when the powder 3A is poured into the cavity H1, the powder 3A can also fills in the two recessed regions defined by the two extending wing portions 11, 12 and the middle portion 10. As such, after the magnetic molding main body 30 is formed, it ensures that the first and second bent portions 210, 220 can be completely enclosed and are not exposed outside of the magnetic molding main body 30.

Figure 19:
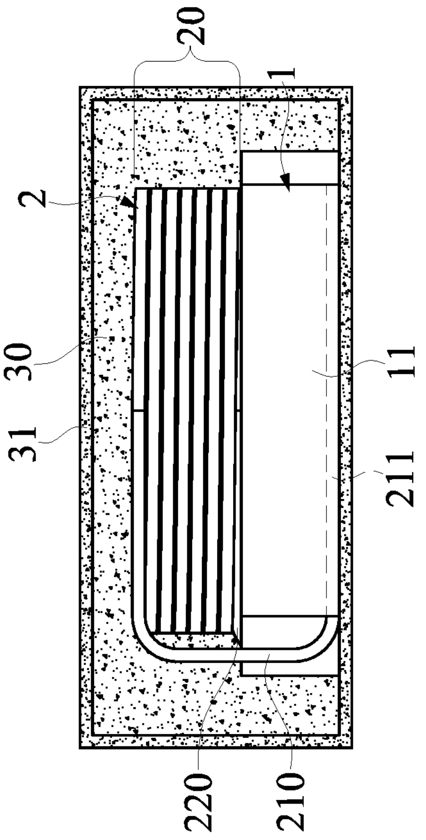

It should be noted that as shown in FIG. 18, after the magnetic molding main body 30 is formed, a portion of the first terminal portion 211 and a portion of the second terminal portion 221 are both exposed at a bottom side of the magnetic molding main body 30. Thereafter, as shown in FIG. 19, an insulating layer 31 is formed to cover an outer surface of the magnetic molding main body 30, the first terminal portion 211, and the second terminal portion 221. The material of the insulating layer 31 can be, for example, a black painting, which can be formed on the magnetic molding main body 30 by a coating process.

Figure 20:
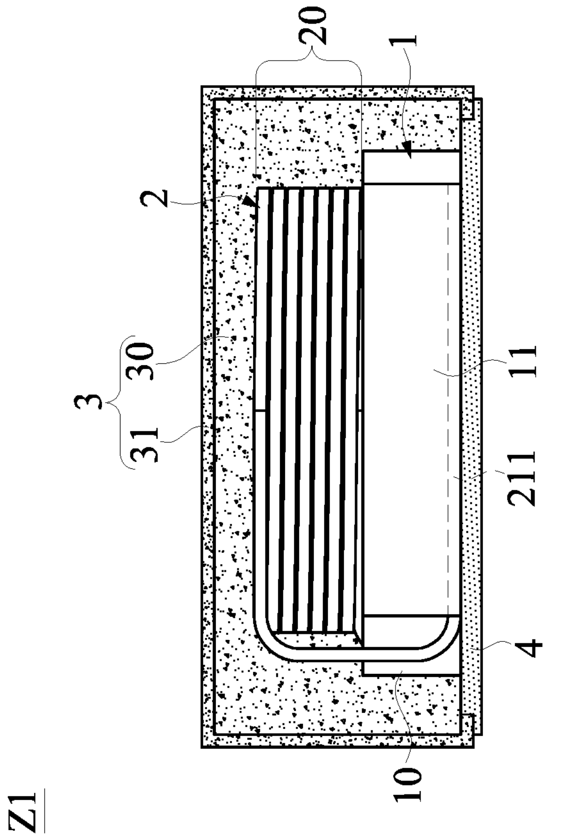
FIG. 20 is a schematic view illustrating step S40 of the manufacturing method according to the embodiment of the present disclosure.
Figure 21:
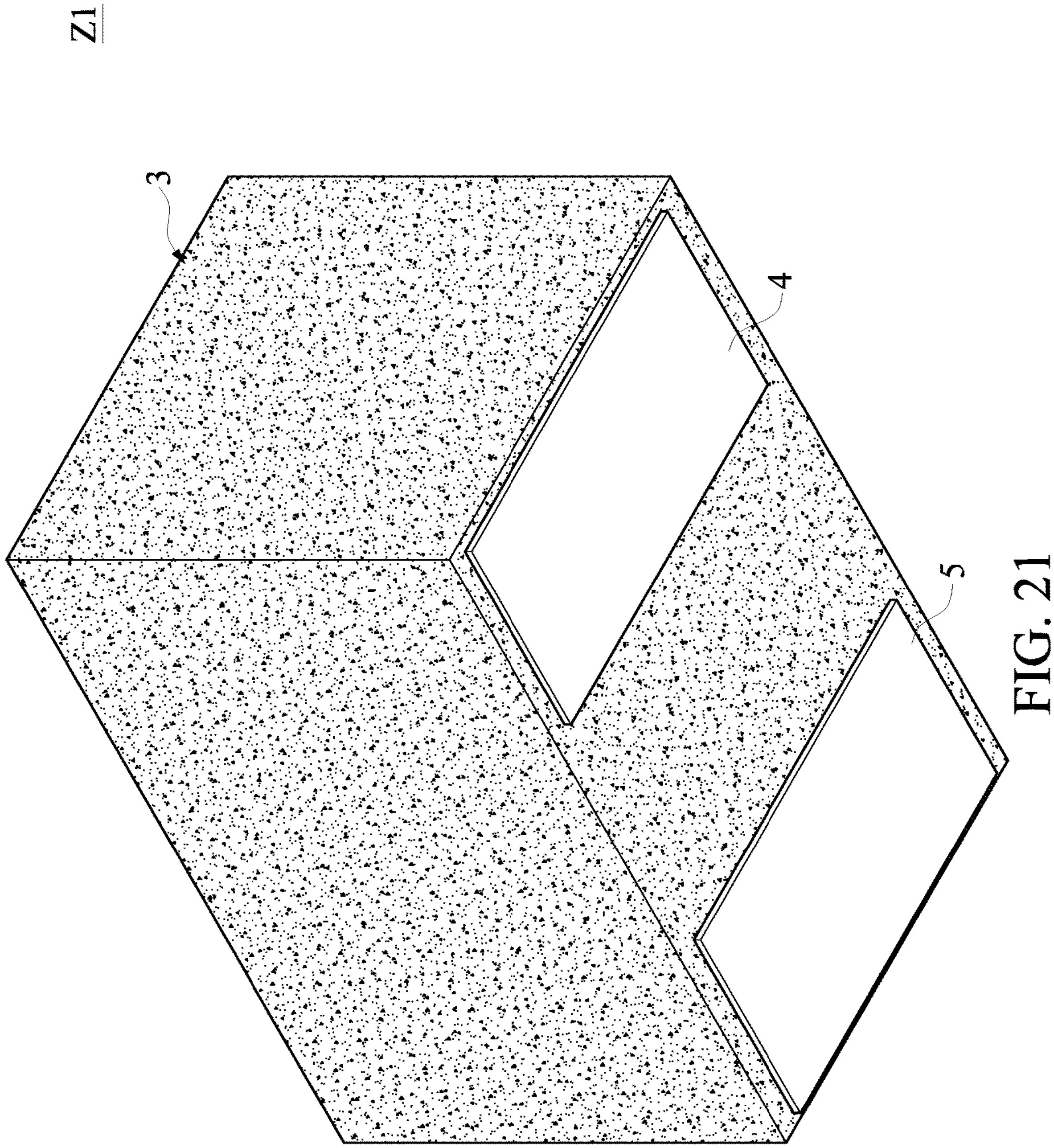
FIG. 21 is a schematic perspective view illustrating step S40 of the manufacturing method according to the embodiment of the present disclosure.

Referring to step S40 shown in FIG. 11, which is to be read in conjunction with FIG. 20 and FIG. 21, a first electrode portion 4 and a second electrode portion 5 are formed on the package structure 3, and the first and second electrode portions 4, 5 are electrically connected to the first terminal portion 211 and the second terminal portion 221, respectively.

After the formation of the insulating layer 31, the first and second terminal portions 211, 221 are covered by the insulating layer 31. Accordingly, before the first and second electrode portions 4, 5 are formed, a portion of the insulating layer 31 can be removed to expose a portion of the first terminal portion 211 and a portion of the second terminal portion 221. Furthermore, since the inner conductive lines of the first and second terminal portions 211, 221 are each covered by the insulating covering layer, after the portion of the insulating layer 31 that covers the first and second terminal portions 211, 221, and portions of the insulating covering layers that respectively cover the inner conductive lines of the first and second terminal portions 211, 221 are removed by using a laser, the first electrode portion 4 and the second electrode portion 5 can be formed to be respectively connected to the first terminal portion 211 and the second terminal portion 221. The first and second electrode portions 4, 5 can be formed by an electroplating process, a sputtering process, an evaporation process, etc., and the present disclosure is not limited thereto.

When the inductive device Z1 is mounted on another circuit board (not illustrate in FIG. 20), a surface mounting technology is allowed to be performed so that the first and second electrode portions 4, 5 can be mounted on the circuit board. Since the first and second electrode portions 4, 5 each have a larger contact area, a bonding strength between the inductive device Z1 and the circuit board can be improved.

Beneficial Effects of the Embodiments

In conclusion, one of the advantages of the inductive device and manufacturing method thereof provided by the present disclosure is that by the technical features of "providing a magnetic base 1, 1A, 1B, 1C having an assembling surface 1*a*, an arrangement regions R1 being defined on the assembling surface 1*a*," "assembling a coil structure 2 to the magnetic base 1, 1A, 1B, 1C, in which the coil structure 2 has a though hole 20*h*" and "forming a package structure 3 to cover the magnetic base 1, 1A, 1B, 1C and the coil structure 2, in which the package structure 3 includes a magnetic molding main body 30, and a portion of the magnetic molding main body 30 fills into the through hole 20*h* of the coil body 20 and is connected to the magnetic base 1, 1A, 1B, 1C," the inductive device Z1 can be more flexibly designed, and the fabrication cost and development cost can be prevented from being increased.

To be more specific, each of the magnetic bases 1, 1A, 1B, 1C provided in the embodiments is a coreless magnetic base. Compared to the conventional technology, the size of the coil body 20 of the coil structure 2 is not limited to the size of the core column, and can be designed depending on particular implementations, which allows the inductive device Z1 can be more flexibly designed. Moreover, compared to the conventional magnetic core, the magnetic bases 1, 1A, 1B, 1C provided in the embodiments of the present disclosure can be used to fabricate many different kinds of the coil structures 2. That is to say, it is not necessary for each of the magnetic bases 1, 1A, 1B, 1C to be redeveloped to satisfy the size of the coil body 20, and thus the fabrication cost can be significantly saved.

Additionally, in the magnetic base 1 provided in one of the embodiment in the present disclosure, a thickness of each of the extending wing portions 11, 12 gradually increases along a direction away from the middle portion 10. When the coil structure 2 is assembled on the magnetic base 1, the structures of the extending wing portions 11, 12 can prevent the first and second extending sections 21, 22 from sliding outwards from the middle portion 10 and being loosed.

Furthermore, the magnetic bases 1B, 1C include either the lateral retaining walls 13 or the recessed portion 100 formed on the assembling surface 1*a* for positioning the coil structure 2. As such, during the manufacturing method of the inductive device Z1, the fabricating and assembling steps of the coil structure 2 can be integrated into the same process by directly winding the conductive wire on the arrangement region R1 defined by either the lateral retaining walls 13 or the recessed portion 100 to form the coil body 20. As such, the fabrication time of the inductive device Z1 can be saved. Furthermore, it is more easily to position the coil structure 2 during the step of assembling the coil structure 2 on the magnetic base 1B or 1C.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An inductive device, comprising:

a magnetic base having an assembling surface, wherein an arrangement region is defined on the assembling surface;

a coil structure assembled to the magnetic base and including a coil body, a first extending section, and a second extending section, wherein the coil body has a though hole corresponding in position to the arrangement region, the first extending section includes a first terminal portion, the second extending section includes a second terminal portion, the first and second extending sections both extend from the coil body toward the magnetic base and are wound on the magnetic base, and the first terminal portion and the second terminal portion are both located at a bottom surface of the magnetic base; and a package structure covering the magnetic base and the coil structure, wherein the package structure includes a magnetic molding main body, and a portion of the magnetic molding main body fills into the through hole of the coil body and is connected to the magnetic base.

2. The inductive device according to claim 1, wherein the magnetic base is a coreless magnetic base.

3. The inductive device according to claim 1, wherein the magnetic base and the magnetic molding main body are respectively made of different materials.

4. The inductive device according to claim 1, wherein the magnetic base has a recessed portion that is recessed inwardly from the assembling surface, and an inner wall of the recessed portion has an opening; wherein the coil body is located in the recessed portion, and the first extending section and the second extending section pass through the opening, extend out of the recessed portion, and are fixed at the bottom surface of the magnetic base.

5. The inductive device according to claim 1, wherein the magnetic base includes two lateral retaining walls disposed on the assembling surface and spaced apart from each other to define at least one gap, and the arrangement region is defined between the two lateral retaining walls; wherein the coil body is located between the two lateral retaining walls, and the first extending section and the second extending section both pass though the at least one gap and so as to be fixed at the bottom surface of the magnetic base.

6. The inductive device according to claim 1, wherein the magnetic base includes a middle portion and two extending wing portions connected to the middle portion, the two extending wing portions are located at two opposite sides of the middle portion, and extend from the middle portion in two opposite directions, respectively; wherein a thickness of each of the extending wing portions gradually increases along a direction away from the middle portion.

7. The inductive device according to claim 6, wherein two bottom surfaces of the two extending wing portions are recessed inwardly from a bottom surface of the middle portion to form two stepped structures, the first extending section and the second extending section are respectively wound on the two extending wing portions, and the first extending section and the second extending section correspond to the two stepped structures, respectively, and are arranged at a bottom side of the magnetic base.

8. The inductive device according to claim 1, wherein the first extending section includes a first bent portion, the second extending section includes a second bent portion, and the first bent portion and the second bent portion are bent in a same direction.

9. The inductive device according to claim 1, wherein the first terminal portion and the second terminal portion are both covered by the package structure;

wherein the inductive device further comprises a first electrode portion and a second electrode portion that are exposed outside of the package structure, wherein the first electrode portion and the second electrode portion pass through the package structure and are respectively electrically connected to the first terminal portion and the second terminal portion.

10. A manufacturing method of an inductive device, comprising:

providing a magnetic base having an assembling surface, wherein an arrangement region is defined on the assembling surface;

assembling a coil structure to the magnetic base, wherein the coil structure includes a coil body, a first extending section, and a second extending section, the coil body has a though hole corresponding in position to the arrangement region, the first extending section includes a first terminal portion, the second extending section includes a second terminal portion, the first and second extending sections both extend from the coil body toward the magnetic base and are wound on the magnetic base, and the first terminal portion and the second terminal portion are both located at a bottom surface of the magnetic base; and forming a package structure to cover the magnetic base and the coil structure, wherein the package structure includes a magnetic molding main body, and a portion of the magnetic molding main body fills into the through hole of the coil body and is connected to the magnetic base.

11. The manufacturing method according to claim 10, wherein the step of assembling the coil structure to the magnetic base includes:

forming the coil body by winding a conductive wire, and forming the first extending section and the second extending section without winding two end portions of the conductive wire, respectively;

disposing the coil body on the magnetic base with the through hole of the coil body corresponding in position to the arrangement region; and bending the first and second extending sections toward the bottom surface of the magnetic base so as to fix the coil body to the magnetic base.

12. The manufacturing method according to claim 10, wherein the step of assembling the coil structure to the magnetic base includes:

forming the coil body by winding a conductive wire on the magnetic base, and forming the first extending section and the second extending section without winding two end portions of the conductive wire, respectively; and bending the first and second extending sections toward the bottom surface of the magnetic base so as to fix the coil body to the magnetic base.

13. The manufacturing method according to claim 10, wherein the step of assembling the coil structure to the magnetic base includes:

winding a conductive wire to form the coil body, bending the first extending section to form a first bent portion and the first terminal portion connected thereto, and bending the second extending section to form a second bent portion and the second terminal portion connected thereto, wherein the first and second bent portions are both located under the coil body and jointly define an accommodating space; and arranging the magnetic base into the accommodating space with the assembling surface facing toward the coil body, the magnetic base being engaged with the first and second bent portions, wherein the though hole of the coil body corresponds in position to the arrangement region.

14. The manufacturing method according to claim 10, wherein the step of forming the package structure includes:

forming an initial package body by performing a compression molding process, wherein the initial package body covers the coil body and the magnetic base and fills into the through hole, and a first terminal portion of the first extending section and a second terminal portion of the second extending section are partially exposed outside of the initial package body;

performing a heat treatment on the initial package body to form the magnetic molding main body; and forming an insulating layer covering an outer surface of the magnetic molding main body.

15. The manufacturing method according to claim 10, wherein the first and second terminal portions are covered by the package structure, and the manufacturing method further includes:

forming a first electrode portion and a second electrode portion on the package structure, wherein the first electrode portion and the second electrode portion pass through the package structure and are electrically connected to the first terminal portion and the second terminal portion, respectively.

16. The manufacturing method according to claim 10, wherein the magnetic base and the magnetic molding main body are respectively made of different materials.

17. The manufacturing method according to claim 10, wherein the magnetic base has a recessed portion that is recessed inwardly from the assembling surface, an inner wall of the recessed portion has an opening, and the arrangement region is located at a bottom surface of the recessed portion;

wherein, during the step of assembling the coil structure to the magnetic base, the coil body is located in the recessed portion, and both the first extending section and the second extending section pass through the opening, extend out of the recessed portion, and are fixed at the bottom surface of the magnetic base.

18. The manufacturing method according to claim 10, wherein the magnetic base includes a lateral retaining wall disposed on the assembling surface, wherein the lateral retaining wall defines the arrangement region and has at least one gap;

wherein, during the step of assembling the coil structure to the magnetic base, the coil body is disposed in the arrangement region, and both the first extending section and the second extending section pass through the at least one gap and extend to the bottom surface of the magnetic base.

19. The manufacturing method according to claim 10, wherein the magnetic base is a coreless magnetic base.

* * * * *